(12) United States Patent
Kunkel

(10) Patent No.: US 11,996,023 B2
(45) Date of Patent: May 28, 2024

(54) VIEWER SYNCHRONIZED ILLUMINATION SENSING

(71) Applicant: DOLBY LABORATORIES LICENSING CORPORATION, San Francisco, CA (US)

(72) Inventor: Timo Kunkel, Kensington, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/640,803

(22) PCT Filed: Sep. 3, 2020

(86) PCT No.: PCT/US2020/049239
§ 371 (c)(1),
(2) Date: Mar. 4, 2022

(87) PCT Pub. No.: WO2021/046242
PCT Pub. Date: Mar. 11, 2021

(65) Prior Publication Data
US 2022/0375378 A1 Nov. 24, 2022

Related U.S. Application Data

(60) Provisional application No. 62/896,203, filed on Sep. 5, 2019.

(30) Foreign Application Priority Data

Sep. 5, 2019 (EP) .................................... 19195627

(51) Int. Cl.
*G09G 3/20* (2006.01)
*G06F 3/01* (2006.01)
*H04R 1/10* (2006.01)

(52) U.S. Cl.
CPC ............... *G09G 3/20* (2013.01); *G06F 3/012* (2013.01); *H04R 1/1041* (2013.01);
(Continued)

(58) Field of Classification Search
None
See application file for complete search history.

(56) References Cited

U.S. PATENT DOCUMENTS 8,752,963 B2   6/2014   McCulloch
8,786,675 B2   7/2014   Deering
(Continued)

FOREIGN PATENT DOCUMENTS

JP   2010186044 A   8/2010
JP   2012128206 A   7/2012
JP   2017523481 A   8/2017

OTHER PUBLICATIONS

Shwartz, Alfred, "Head tracking stereoscopic display", Google scholar, IEEE Transactions on Electron Devices 33.8 (1986): 1123-1127.

*Primary Examiner* — Ifedayo B Iluyomade

(57) ABSTRACT

An embodiment of the disclosure provides a method and a system to sense a light source based on a viewer position in relation to display device. The system receives sensor data from one or more light sensors mounted on a wearable device worn by a viewer of a display device in a room, where a field of view for the light sensors covers at least a field of view of the viewer. The system identifies a light source perceived in a field of view of the viewer based on the sensor data. The system transmits data for one or more operations to be performed by the display device displaying content to the viewer to compensate for a change in brightness or color of the content caused by the light source based at least in part on light source information of the light source.

23 Claims, 19 Drawing Sheets

BACK AMBIENT LIGHT IS DIM

NO GLARE COMPENSATION
REASON: BACKLIGHT IS
DIFFUSE AND DIM, NOT CAUSING
SIGNIFICANT LEVELS OF GLARE

(52) U.S. Cl.
CPC ............... *G09G 2320/0233* (2013.01); *G09G 2320/0242* (2013.01); *G09G 2320/0626* (2013.01); *G09G 2320/066* (2013.01); *G09G 2320/0666* (2013.01); *G09G 2354/00* (2013.01); *G09G 2360/144* (2013.01)

(56) References Cited

U.S. PATENT DOCUMENTS

| | | |
|---|---|---|
| 8,965,460 B1 | 2/2015 | Rao |
| 9,101,312 B2 | 8/2015 | Waldorf |
| 9,123,272 B1 | 9/2015 | Baldwin |
| 9,626,936 B2 | 4/2017 | Bell |
| 9,635,352 B1 | 4/2017 | Henry |
| 9,996,719 B1 | 6/2018 | Amy |
| 10,180,572 B2 | 1/2019 | Osterhout |
| 2010/0103077 A1* | 4/2010 | Sugiyama .......... G02B 27/0172 340/425.5 |
| 2012/0182276 A1 | 7/2012 | Kee |
| 2012/0229487 A1 | 9/2012 | Samanta |
| 2014/0333773 A1 | 11/2014 | Davis |
| 2015/0089551 A1* | 3/2015 | Bruhn ................... H04N 5/58 725/80 |
| 2015/0169780 A1 | 6/2015 | Mishra |
| 2015/0338658 A1 | 11/2015 | Davis |
| 2016/0267708 A1 | 9/2016 | Nistico |
| 2017/0104928 A1 | 4/2017 | Chase |
| 2018/0033209 A1 | 2/2018 | Akeley |
| 2018/0068449 A1 | 3/2018 | Malaika |
| 2018/0211440 A1* | 7/2018 | Kunkel .................. G09G 3/00 |
| 2018/0227470 A1 | 8/2018 | Rönngren |
| 2018/0275410 A1 | 9/2018 | Yeoh |
| 2019/0018505 A1 | 1/2019 | Cherukuri |
| 2019/0142270 A1 | 5/2019 | Monhart |
| 2019/0219844 A1* | 7/2019 | Knoll .................... A61B 3/113 |

\* cited by examiner

FIG. 5A

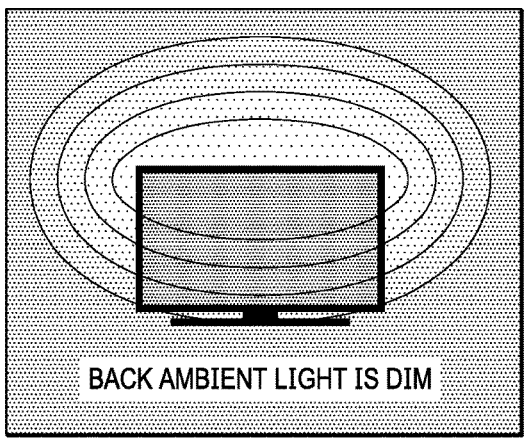

BACK AMBIENT LIGHT IS DIM

NO GLARE COMPENSATION
REASON: BACKLIGHT IS DIFFUSE AND DIM, NOT CAUSING SIGNIFICANT LEVELS OF GLARE

FIG. 5B

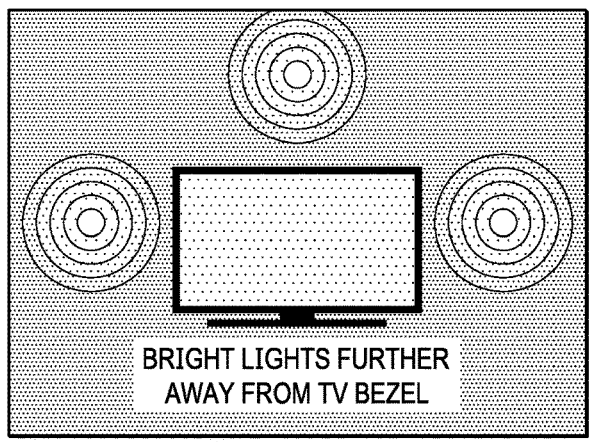

BRIGHT LIGHTS FURTHER AWAY FROM TV BEZEL

INTERMEDIATE GLARE COMPENSATION
REASON: THE BRIGHT LIGHTS ARE FURTHER AWAY FROM THE BEZEL, CAUSING A REDUCED LEVEL OF GLARE

FIG. 5C

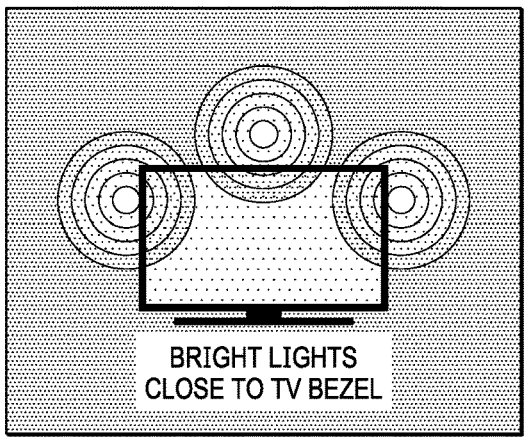

BRIGHT LIGHTS CLOSE TO TV BEZEL

FULL GLARE COMPENSATION
REASON: THE BRIGHT LIGHTS ARE VERY CLOSE TO THE BEZEL, CAUSING SIGNIFICANT LEVELS OF GLARE

NO LIGHT SOURCES FOUND

THREE LIGHT SOURCES FOUND

THREE LIGHT SOURCES FOUND

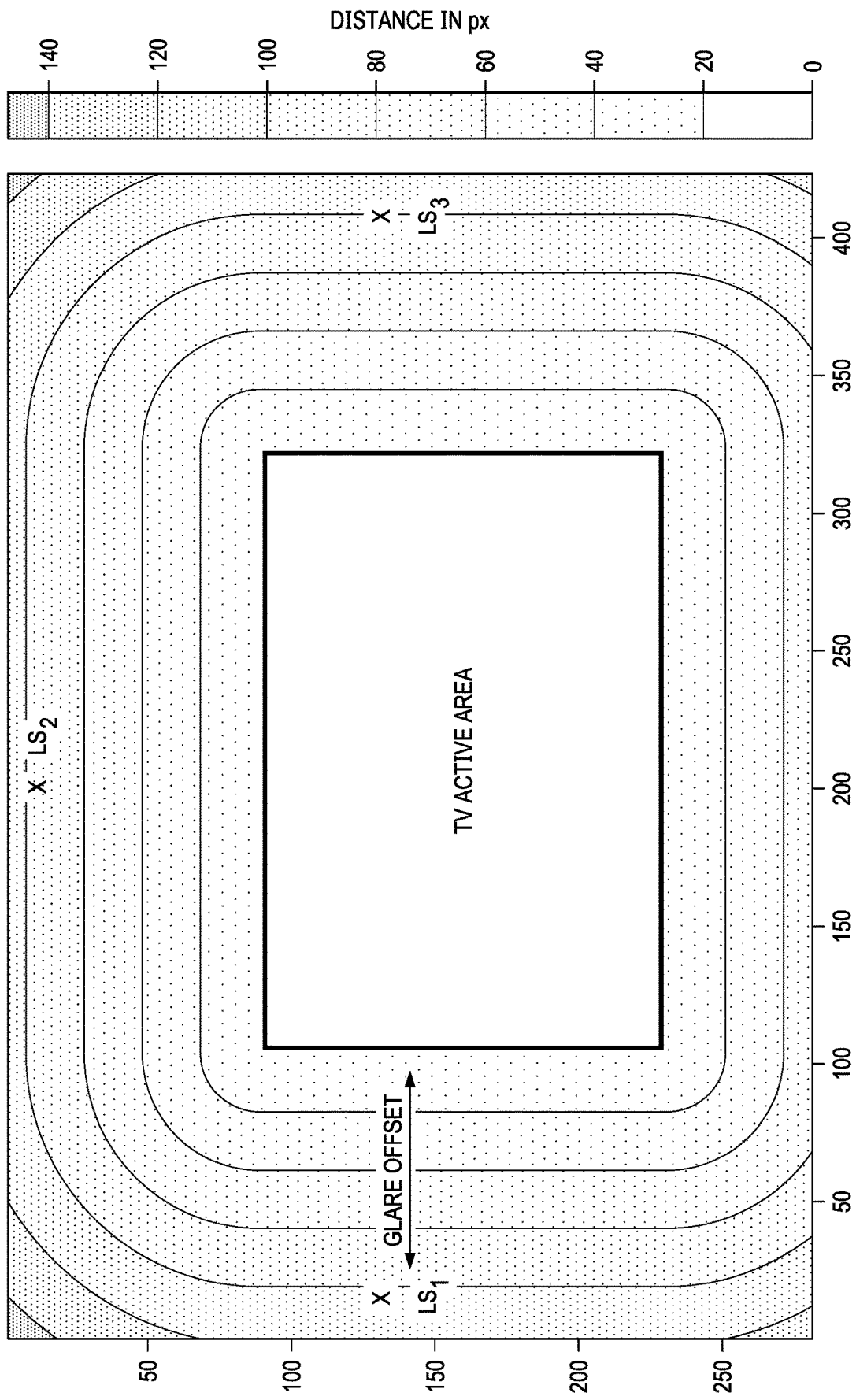

VIEWER SYNCHRONIZED ILLUMINATION SENSING

CROSS-REFERENCE TO RELATED APPLICATIONS

This application claims priority to European Patent Application No. 19195627.5, filed 5 Sep. 2019 and U.S. Provisional Patent Application No. 62/896,203, filed 5 Sep. 2019, which are incorporated herein by reference.

TECHNICAL FIELD

The present disclosure relates generally to vision devices, and in particular, to viewer synchronized illumination sensing.

BACKGROUND

Video materials may be created and color graded with specific artistic intent in professional production settings. These professional production settings may be very different from viewing environments in which the video materials are to be rendered. As a result, instead of seeing vivid, highly detailed images with intended color properties, viewers may see dull, washed out, poorly colored images that significantly deviate from the artistic intent with which the video materials were initially created and color graded in the professional production settings.

Display devices such as consumer televisions, mobile devices, etc., may attempt to adjust picture mapping to compensate for ambient/glare light based on measurements of surrounding light levels. However, such adjustment and compensation (e.g., only considering diffuse, non-directional light, etc.) may be too simplistic to generate full precise real time picture mapping to effectively alleviating more complex ambient and glare light problems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 5A-5G illustrate examples for different levels of glare assessment according to some embodiments.

DETAILED DESCRIPTION

Figure 1A:
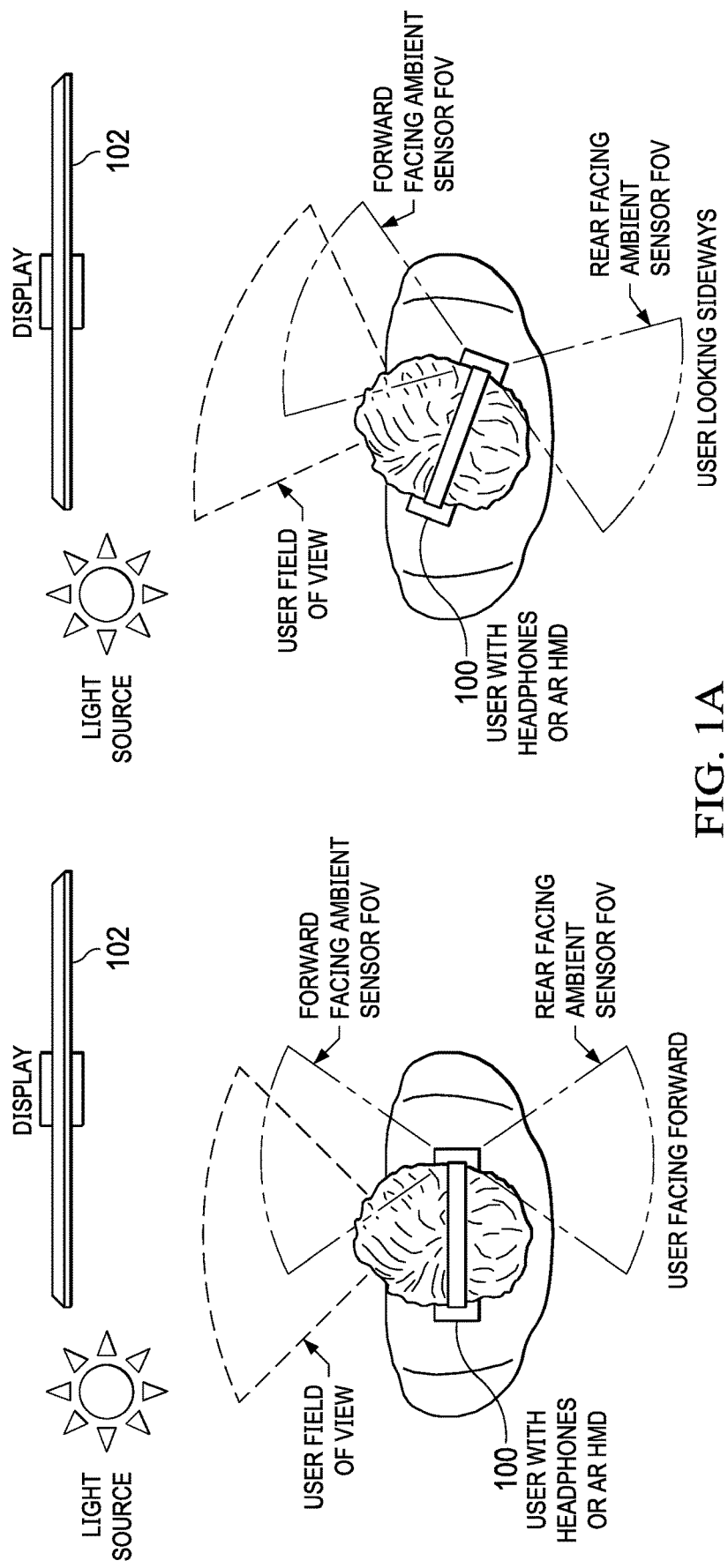
FIG. 1A shows an example illustration of a user/viewer facing forward and facing sideways according to some embodiments.

Example embodiments, which relate to surround ambient light sensing, processing and adjustment for vision devices, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. "Light source" refers to an object emitting light (photons) but also an area that reflects or transmits a high amount of light. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

According to one aspect, an embodiment of the disclosure provides a method and system to sense a light source based on the position of a viewer. The system receives sensor data from one or more light sensors mounted on a wearable device (e.g., a wearable headset) worn by a viewer of a display device in a room, where a field of view for the light sensors covers a field of view of the viewer. Here, the light sensors can be omnidirectional or directional single pixel or pixel matrix sensor such as that used in cameras. The system identifies a light source perceived in a field of view of the viewer based on the sensor data. The system transmits data for one or more operations to be performed by the display device displaying content to the viewer to compensate for a change in brightness or color of the content caused by the light source based at least in part on light source information of the light source.

In one embodiment, the system determines whether the light source is a direct light source or a reflected light source reflected off a surface of the display device by: determining a location for a surface of the display device and determining a location of the light source to determine if the light source is a direct light source or a reflected light source. In one embodiment, the system further tracks a change in luminance of the light source over a predetermined period of time to determine whether the change in luminance is gradual or abrupt. The system determines a potential source for the light source using a deterministic algorithm based on the tracked changes.

In another embodiment, if the light source is a reflected light source, the system analyzes an average luminance and a standard deviation of luminance for the surface of the display device. The system identifies if the reflected light source is an ambient light source or a glare light source based on the average luminance and the standard deviation of luminance. In another embodiment, a glare light source is identified by identifying a portion of the surface of the display device with a large standard deviation of luminance.

In another embodiment, if the light source is a reflected light source or a glare light source, the system identifies whether the light source is controllable. If the light source is controllable, the system controls a brightness of the light source to compensate for the light source if the light source is controllable. If the light source is not controllable or if no change is detected from the display screen after the controlling, the system suggests a change in a viewing position to the viewer. In another embodiment, determining if the light source is controllable includes automatically detecting internet of things (IOT) based light sources for the room over a local network, and registering each of the detected light sources as a controllable light source.

In another embodiment, the glare light source is identified by identifying one or more artifacts via a positional discrepancy between images captured by a left light sensor and a right light sensor of the one or more light sensors mounted on the wearable device or a temporal discrepancy between two or more images of a light sensor of the wearable device. In another embodiment, the one or more light sensors mounted on the wearable device worn by the viewer includes a left and a right light sensor to a left and a right side of a left and a right eye of the viewer respectively.

In another embodiment, if the light source is identified as a direct light source, the system determines if the direct light source is in the field of view of the viewer. If in a field of view of the viewer, the system determines a shortest distance from the direct light source to an edge of the surface of the display device. The system determines an intensity of the direct light source for the one or more operations to be performed based on the determined distance and intensity. In another embodiment, if there are two or more viewers, the one or more operations is to be performed based on an average or otherwise weighted intensity perceived as being in a field of view for each of the two or more viewers. In another embodiment, the system determines if the direct light source is perceived as being in a field of view of a left, a right, or both eyes of the viewer wearing the wearable device based on images captured by a left and a right light sensor of the one or more light sensors mounted on the wearable device.

In another embodiment, if the left and right light sensors both perceive a direct light source, the system determines that the direct light source is visible to both eyes of the viewer. In another embodiment, if only one of the left or the right light sensor, but not both, senses a direct light source, the system determines a vantage point of eye for the viewer based on a measured vantage point of sensor, and a distance offset from the sensor to the eye of the viewer being projected a distance from the wearable device to the surface of the display device. The system determines if the vantage point of eye is outside the surface of the surface of the display device. If it is outside, the system determines that the direct light source is not visible to both eyes.

In another embodiment, the system determines a motion vector of the wearable device based on a motion sensor mounted on the wearable device. The system determines, based on the vantage point of eye, the direct light source is occluded by a surface of the display device based on the motion vector.

In one embodiment, the one or more operations to be performed by the display device includes adjusting a minimum black level displayed by the display device, and adjusting a tone mapping characteristic of the display device. In another embodiment, the one or more operations to be performed by the display device include notifying a viewer to take a manual action to compensate for a non-controllable glare light source. In one embodiment, the one or more sensors include one or more light transducers or image capturing devices. In one embodiment, transmitting the data for one or more operations to be perform by the display device causes the display device to look up an entry in a look up table (or parametric adjustment parameters) for one or more operations to be perform based on a type of the light source to cause the one or more operations to be performed.

According to a second aspect, an embodiment for a method and a system to compensate for a light source is disclosed. The system (e.g., a display system of a display device) receives data for one or more operations to be performed by a display device displaying content to a viewer. The system retrieves light source information from the received data identifying a light source perceived as being in a field of view of the viewer. The system looks up in a look-up-table for one or more operations to be performed based on the light source information to compensate for a change in brightness or color of the content caused by the light source. The system performs the one or more operations based at least in part on the light source information.

According to a third aspect, an embodiment for a method and a system to identify a light source based on a reflection on a surface (e.g., passive reflector or a portion of a face) of a viewer is disclosed. The system receives sensor data from one or more light sensors mounted on or close to or nearby a display device in a room, where the one or more light sensors is directed at a viewer viewing the display device. The system identifies a reflection for a light source on a passive surface of the viewer based on the sensor data. The system analyzes the light source to be a glare light source or an ambient light source based on the reflection. The system performs one or more operations based at least in part on the analysis.

A display device can include built-in light sensors to capture a forward-facing ambient light. This is beneficial to assess the amount of light incident to a display panel of the display device however this information does not give indication about the amount of light and the type of light sources experienced from the point of view of a viewer. It would be therefore beneficial to have light source measurements in order to provide a more accurate ambient light adjustment and compensation by a display device (e.g., projector, TV, laptop, computer display, or mobile device) when a viewer consumes images/videos from the display device. While ambient sensors can be placed in the room of the viewer, they may not necessarily capture information from the viewpoint(s) of the viewer(s). In another embodiment, if the display device has a mountable ambient sensor. Ambient light captured by the wearable device can be compared with the light information captured by the ambient sensor of the display device to improve an estimation of the ambient light captured.

FIG. 1A shows an example illustration of a user/viewer facing forward and facing sideways according to some embodiments. Referring to FIG. 1A, in one embodiment, a viewer wears a wearable device (e.g., headset/headphone or an augmented reality/virtual reality head mounted display (AR/VR HMD), etc.) 100 with a light sensing system having one or more optical sensors. In one embodiment, the optical sensors rotate in sync with a direction the viewer is facing. The light/optical sensors can be image sensors and/or light transducers that captures light in a conical field of view having a similar/overlapping field of view of the viewer. Unlike static ambient sensors placed in strategic locations of a room of the viewer, headset 100 can identify a field of view of the viewer in real-time. Referring to FIG. 1A, in one embodiment, the light sensing system can sense a light intensity in the field of view of the viewer. The light sensing system can include the following configurations: forward light sensing with a predetermined sensing cone, both forward and rear light sensing with predetermined sensing cones, or an omnidirectional light sensing sphere.

In one embodiment, a light sensing system can identify a field of view having information for ambient light incident on a display screen and information of direct light from behind the display screen outside of an area of the display screen. In one embodiment, a light sensing system can identify content/light source that is visible to a viewer but may not be viewable from sensor(s) positioned elsewhere in the room, such as wall-mounted light sensors or display device-mounted light sensors. In another embodiment, the light sensing system can be mobile (indoor or outdoor) as headset 100 can be wireless and mobile. In another embodiment, the light sensing system can transmit light information of a first-person view to a display device to adjust a color appearance of content displayed by the display device viewable by the viewer.

Figure 1B:
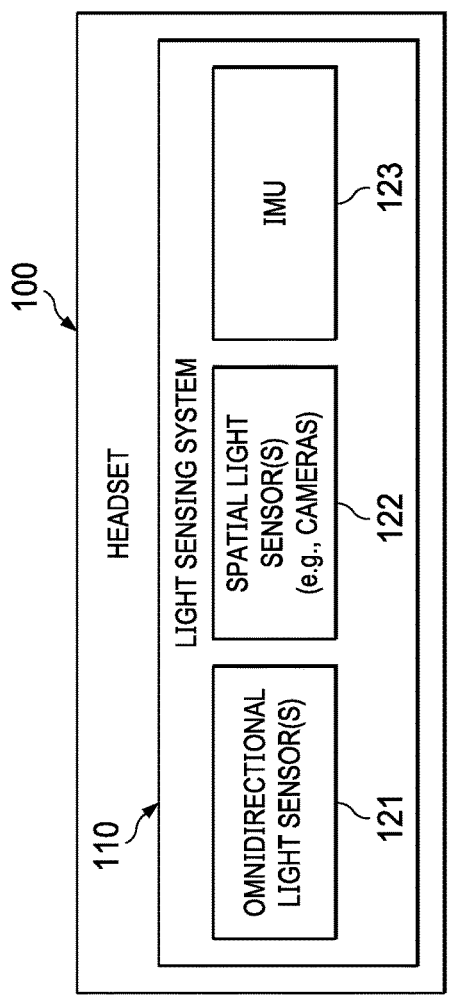
FIG. 1B shows an example block diagram of a headset with a light sensing system according to one embodiment.

FIG. 1B shows an example block diagram of a headset with a light sensing system according to one embodiment. Referring to FIG. 1B, headset 100 includes a light sensing system 110. Light sensing system 110 can detect ambient light and glare for a field of view of the sensors. Light sensing system 110 can include omnidirectional light sensors 121 to detect ambient light, spatial light sensors 122 to detect positions and placements of directional light sources. Light sensing system 110 can include also inertial measurement unit (IMU) 123 to measure a position and an orientation for the headset to determine a real-time field of view of the viewer. IMU 123 can include a combination of MEMS accelerometers, and/or gyroscopes for positional, orientation, and motion sensing.

In one embodiment, light sensors 121-122 can be implemented as one or more light transducers that convert light to electrical signals. In another embodiment, light sensors 121-122 can be an implemented as a left optical camera and a right optical camera, or a single camera. In one embodiment, for omnidirectional optical sensors, light sources (and occlusions) can detected and compensated using other positional and/or acceleration sensors of IMU 123.

Figure 2B:
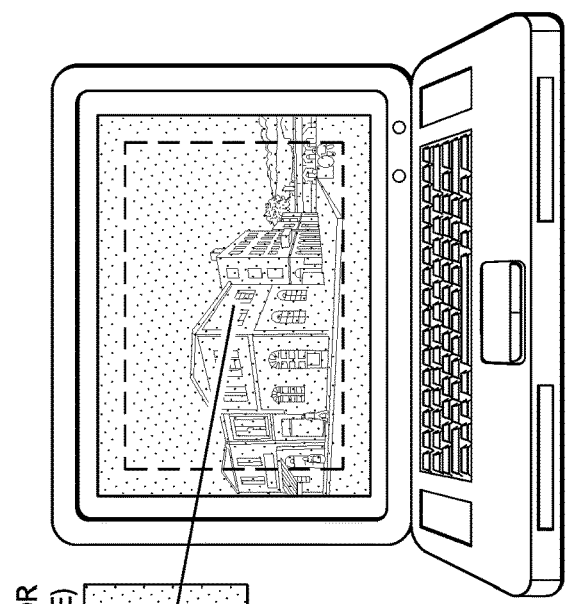
FIGS. 2A-2B illustrate an example of illumination/light sensing using the type of reflection on a screen of a display device according to one embodiment.
Figure 2A:
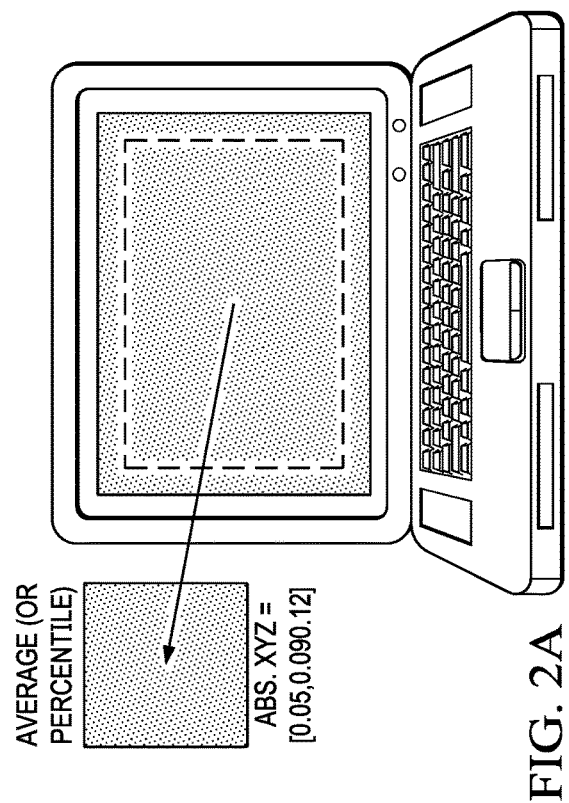

FIGS. 2A-2B illustrate an example of illumination/light sensing using the type of reflection on a screen of a display device according to one embodiment. In one embodiment, to identify an ambient light source, a light sensor (such as a camera) of a light sensing system of a headset can identify a field of view of the viewer. Based on the identified view of field, the system can identifies a black area (e.g., display panel) of a display device. In one embodiment, the identification can send a request to the display device to cause the display device to actively display contents (e.g. pulse between black and white) to allow the sensing system to detect the display panel. Based on the identified display screen area, the system analyzes an average luminance and a standard deviation for the area to identify a type of light source (e.g., ambient or glare) detected for typical viewing conditions. Note that physical motion/shake of the light sensing system should not affect the captured information because light information captured by the light sensors is averaged over the display area. In one embodiment, the light sensing system having an inertial measurement unit (IMU) can track and compensate for extreme movements and/or shakes from the viewer.

Referring to FIG. 2A, the display screen with a background illumination level with no noticeable ambient light is captured as a reference lighting condition, e.g., when the display screen is turned off. Referring to FIG. 2B, the display screen is captured with ambient light, e.g., the reference lighting condition combined with ambient contribution. Using the captured pixels, and compared with a reference, an amount of ambient light with intensity averaged over the display area and a standard deviation for these pixels can be calculated. Next, the lighting condition can be analyzed using the calculated average intensity and standard deviation values.

An example function in pseudocode for a light analysis algorithm can be as follows:

```
FUNCTION AssessCompensation(PatchLum, PatchSdDev)
    IF PatchLum==high && PatchStdDev==small
        AmbientCondition='higher ambient';
        Compensate_for_diffuse ambient_light
    ELSEIF PatchLum==high && PatchStdDev==larger
        AmbientCondition='higher ambient';
        Compensate_for_glare_and_ambient_light(DistanceInPx,
        LightSourceIntensity);
    ELSE
        %PatchLum==low
        AmbientCondition='dark room';
    END
END
```

Here, if the luminosity intensity is higher than an intensity threshold (e.g., high) and the standard deviation (SD) is larger than a SD threshold (e.g., large), then there could be both glare and ambient light present and the system should compensate for both glare and ambient light. If the luminosity intensity is high and the SD is smaller than the SD threshold (e.g., small) then there is predominantly diffuse ambient light and the system can compensate for the ambient light (if a compensation threshold is met). If the luminosity intensity is lower than the intensity threshold (e.g., low) then no action is taken. As such, the need for dedicated calibration sessions is reduced and the picture quality can be improved.

In one embodiment, the light analysis algorithm can learn about the ambient conditions over a predetermined period of time. The parameters to be learned can include the typical viewing conditions by a viewer, properties of individual light sources (e.g., whether they can be controlled, location, and/or brightness or color), display devices viewable by the viewer, reflectance of materials in a room, and the size or other geometric properties (e.g., curved panels) of display(s) of the display devices. For example, if light intensity of a particular light source changes gradually and/or slowly, then it is likely that this light source is the sun or an outdoor light source that is not under the control of the viewer. For such a light source, the system can notify a viewer of the light source and/or automatically adjust a control to control the blinds of the room provided that they are controllable. For another example, if light intensity of a particular light source changes abruptly, then the system can check if a controllable light source was triggered (e.g. via a light switch or a mobile device) provided that the trigger was detectable by the light sensing system over the network. The system can also assess the illumination level of identified light sources. To compensate, the system can notify the viewer about the light source and/or directly control the triggered lights to adjust for the ambient and/or glare reflection in the display(s) of the display devices. For yet another example, a direct reflection of light source is visible as a) reflected by an active display area of a display device or b) behind the TV (e.g., direct light). To compensate, the system can notify the viewer about the light source and/or directly control an adjustable light source. Thus, the system can improve a viewing experience of a viewer over time.

In one embodiment, the light sensing system can include a feedback mechanism to determine an action to remedy for the light source. For example, the system may identify if a light source reflected on a display screen is controllable. The system can then automatically control a light source to adjust an intensity of the light source in the room. If a change in intensity of light is detected by the light sensing system of the headset, the system can further change the light intensity to compensate for the ambient/glare, or suggest/confirm to a viewer to change a viewing position, or notify a viewer which light source(s) is/are causing the ambient/glare reflection based on the information about the light source being adjusted. If no change is detected, the system can suggest to a viewer to simply change a viewing position or until a glare is no longer detectable, or suggest to the viewer to dim the lights manually in the room.

Figure 3:
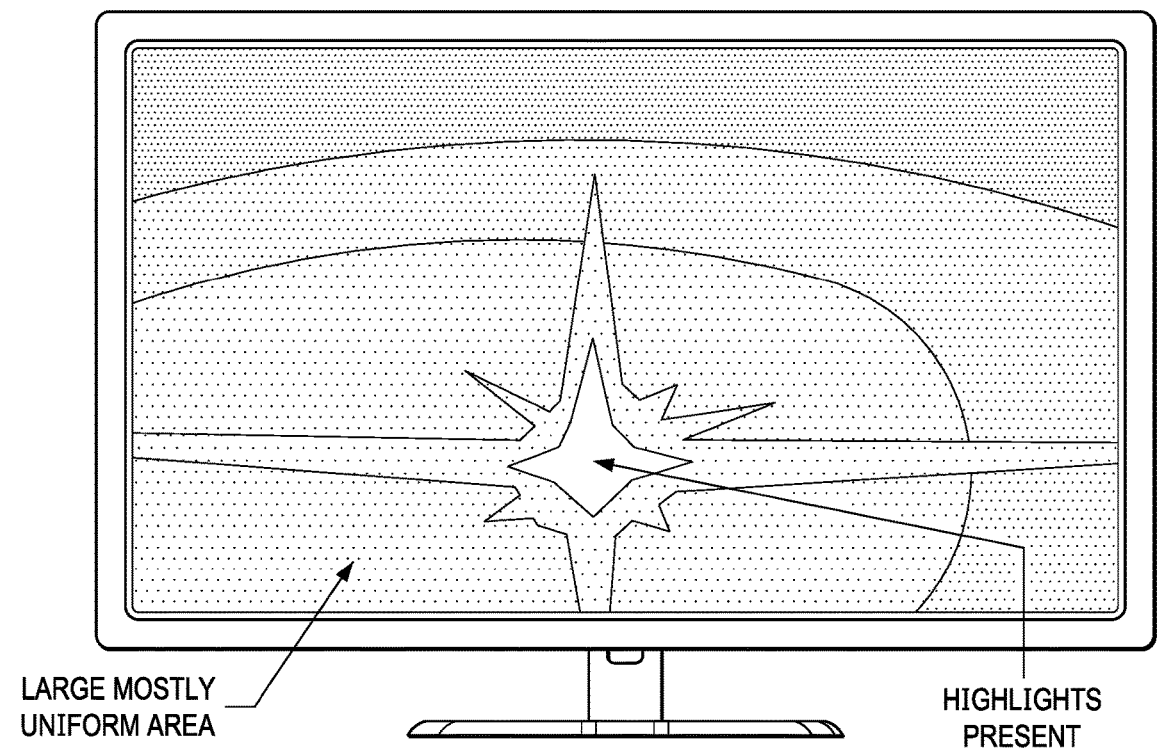
FIG. 3 illustrates an example of detection for glare reflected from a display screen according to one embodiment.
Figure 3:
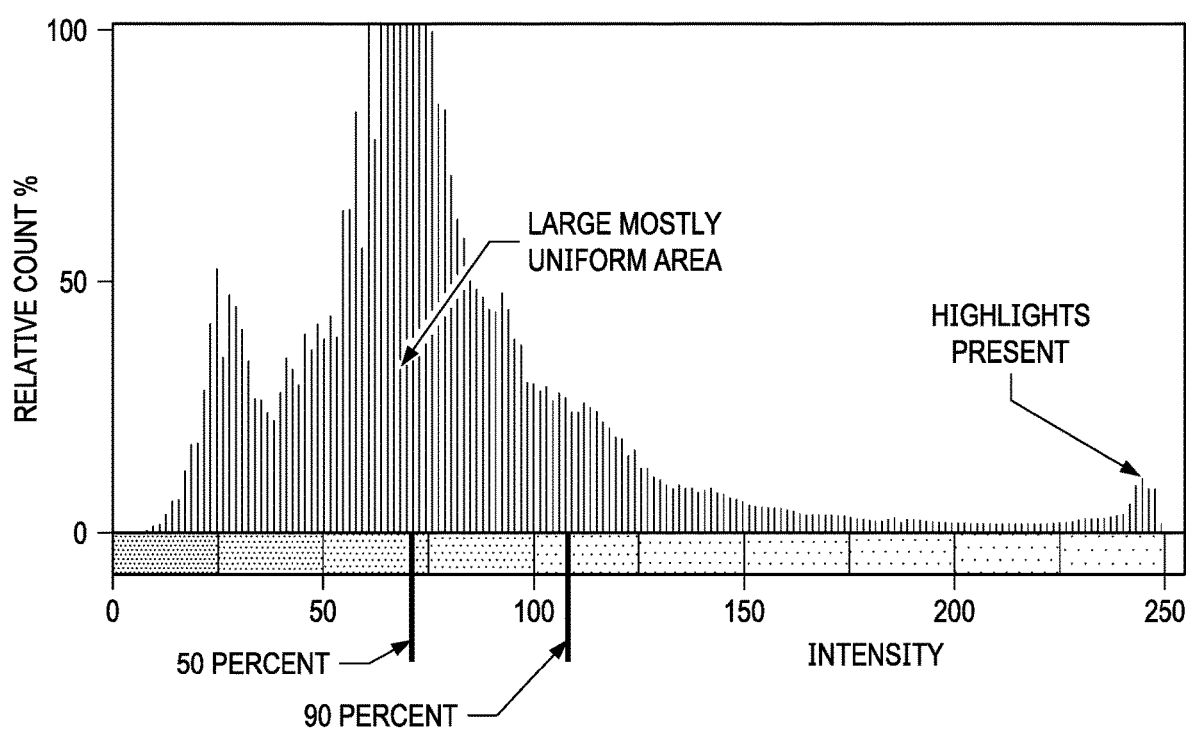

FIG. 3 illustrates an example of detection for glare reflected from a display screen according to one embodiment. Referring to FIG. 3, a display screen (e.g., display device) includes glare and diffuse ambient light reflections. The glare component causes a harsh highlight (approximately from hundreds to a few thousands of cd/m$^2$) whereas the ambient light component typically causes less (approximately a few to tens of cd/m$^2$). In one embodiment, if the display device can generate pixels luminances that are approximate to or higher than the glare luminances, then the picture fidelity on the display device can be improved by changing the rendering onscreen. In one embodiment, the glare components can be detected by looking at high intensity highlights in the display reflections. If the display reflection intensity is above a predetermined threshold then glare is present. In another embodiment, glare can be detected by analyzing a predetermined percentage (e.g., 90%, or upper 10%) of the detected pixels with high intensity and the percentage depends on a property of the display screen (matte or glossy). Based on the pixels in the higher percentage, if there is a large variation (or standard deviation) then glare is present. In another embodiment, a degree of intensity to be compensated can be determined based on the analyzed percentage. For example, the compensation can be based on the 50% intensity value.

Figure 4A:
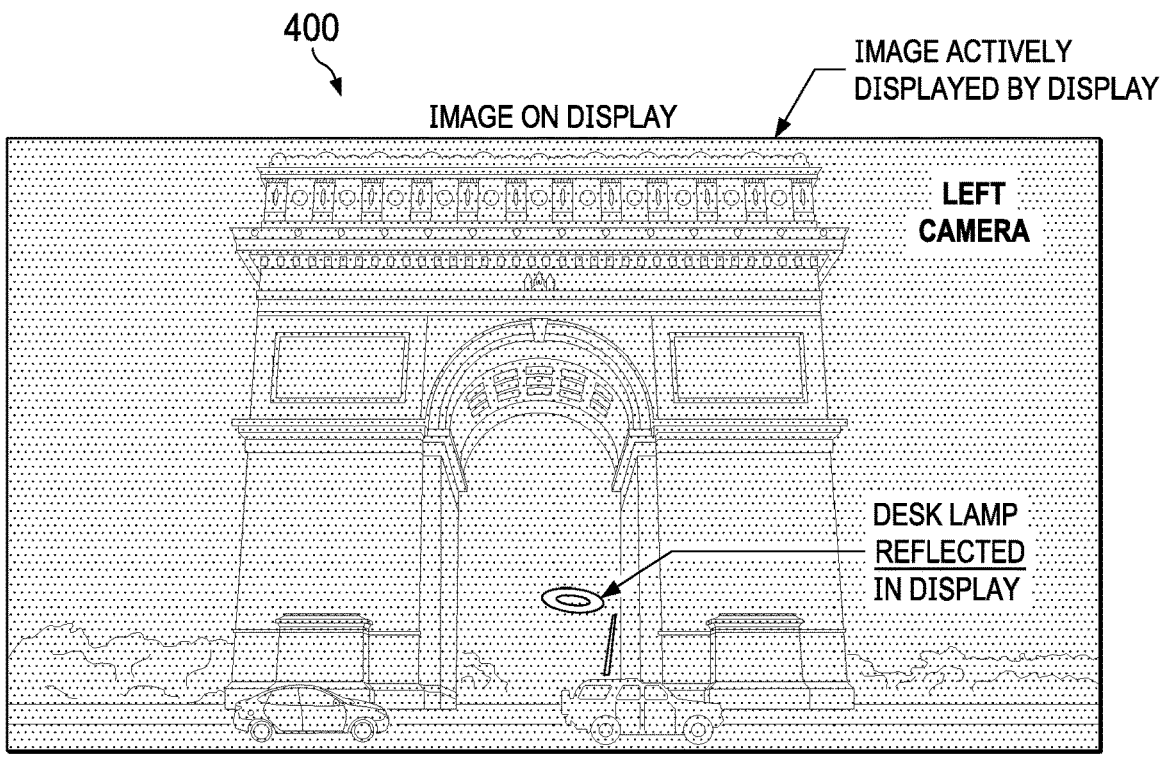
FIGS. 4A-C illustrate an example of detection for glare from artifacts (here the desk lamp as shown in FIG. 4C) in a display screen according to one embodiment.
Figure 4B:
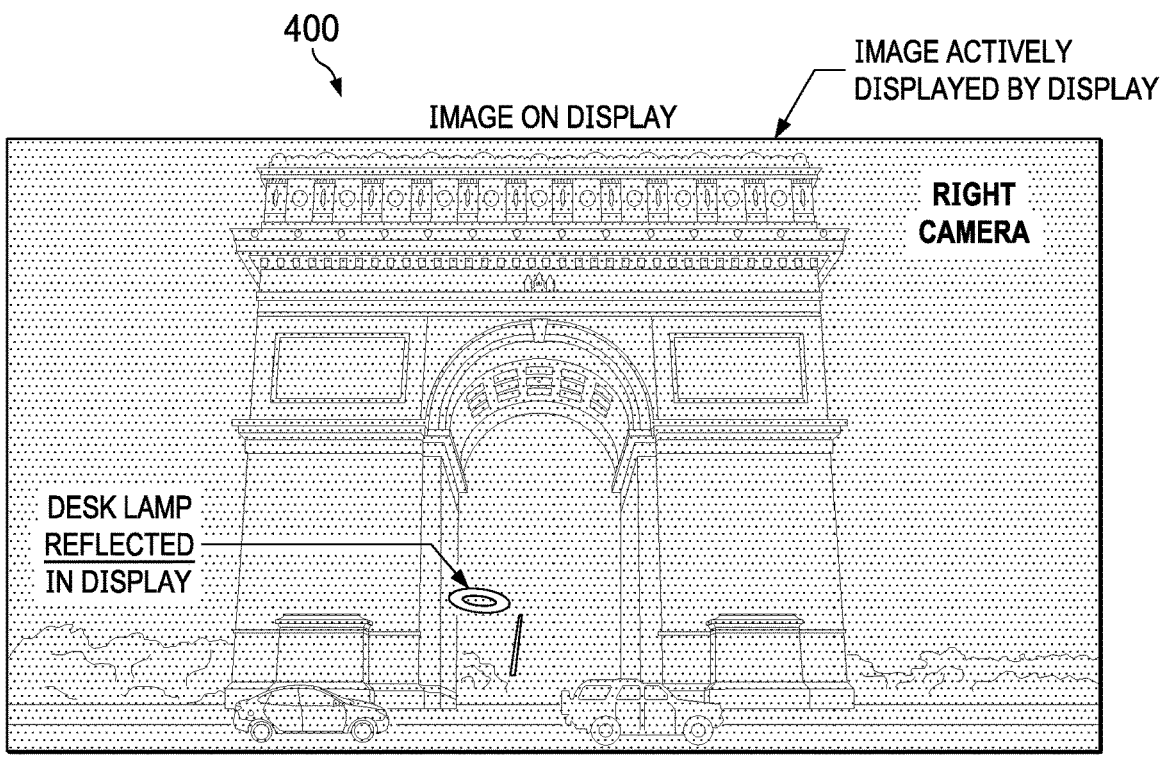
Figure 4C:
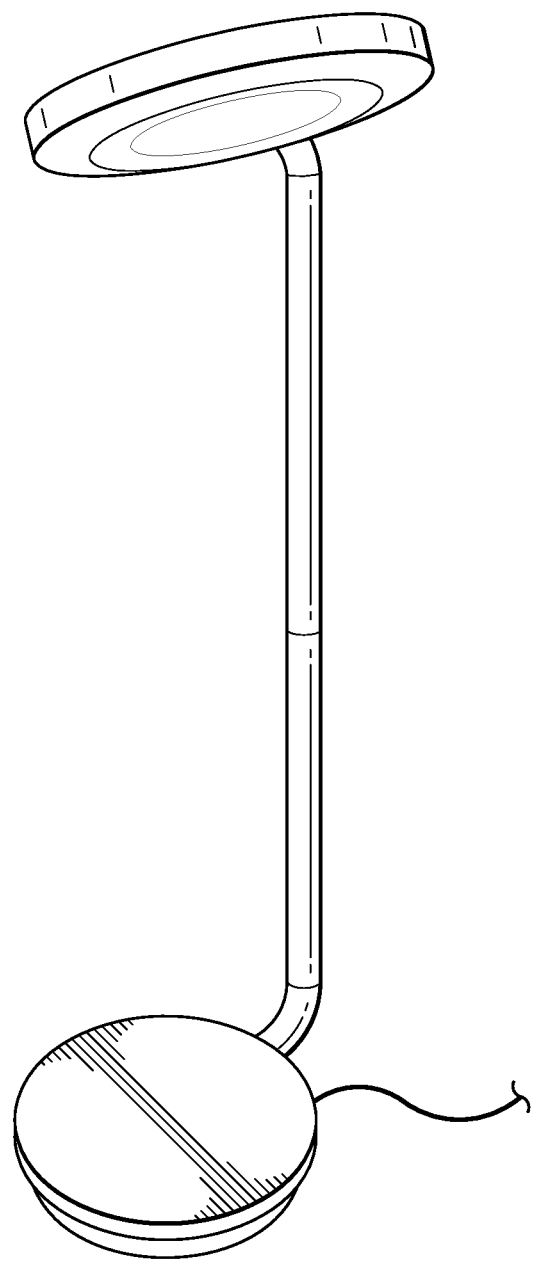

FIGS. 4A-4C illustrate an example of detection for glare from artifacts (here the desk lamp as shown in FIG. 4C) in a display screen according to one embodiment. Although glare can be initially indicated by a large standard deviation (SD) in light intensity in the screen, however, if a display screen is displaying content then the large SD may be part of the content of the display screen and the system would fail in identifying a glare. In one embodiment, if content is shown, then one or more artifacts (such as highlights) can be captured to determine if glare is present. The artifacts can be identified via positional discrepancy between a left and a right image captured by a left camera and a right camera of the light sensing system. In another embodiment, the artifacts can be identified by identifying a constant presence of the artifacts which would not change based on scene cuts. In another embodiment, to avoid detecting a displayed stationary logo as glare, the picture area that is suspicious of being a light source can be analyzed for motion based on a motion of the viewer's headset (e.g., using motion sensors). If a motion of the suspicious light source and a motion of the viewer correlate, then it is likely a light source, otherwise it is a stationary logo displayed.

Referring to FIG. 4, if a desk lamp (shown as reference in FIG. 4C) is reflected off a display screen, then an artifact is highlighted in both a left and a right camera captured image. Calculating a positional discrepancy from the left and the right images, the light sensing system can identify the artifacts not to be part of the content of the display screen. Based on the artifacts, the system can apply glare compensation towards the image based on a glare intensity of the artifact. In another embodiment, based on triangulation, the system can compute a position of the light source (e.g., lamp) in the room with respect to the viewer. Based on the identified light source position, the system can determine if the light source is controllable (previously learned which light sources are controllable), e.g. by looking up a light source identifier (ID) based on position label in an Internet of things (IOT) database storing information for available light sources in the room. The system can also request a speech assistant (e.g., Amazon Alexa, Apple Siri, etc.) to dictate to a viewer which light source is causing a glare. E.g. a speech assistant may dictate "The lamp behind you on the right is causing glare. Please switch it off".

Figure 5D:
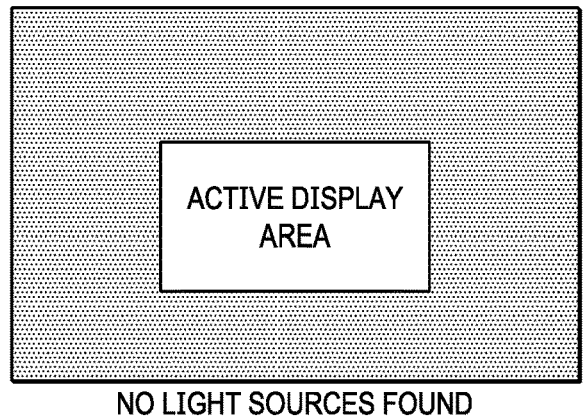

An example pseudocode to find artifacts and an intensity of the artifact from positional discrepancy of a left and a right image can be:

FindMaxPixels=max(abs(LeftImage−RightImage));

GlareIntensity=Mean(LeftImage(FindMaxPixels));

FIGS. 5A-5G illustrate examples for different levels of glare assessment according to some embodiments. In addition to sensing (and subsequently correcting) for diffuse ambient light, the system can also detect and mitigate 'sharp' highlights and emissive lights that are directly visible outside of an active display area. Referring to FIG. 5A, an image capturing an active display area can correspond to an image captured by any light sensors of a light sensing system, such as system 110 of FIG. 1B. Here, if the active display area with a dim back ambient is identified, then no glare compensation is required, because backlight is diffused and dim and does not cause a significant level of glare. Referring to FIG. 5B, if the system detects one or more light sources surrounding the active display area but far away (greater than a threshold distance in comparison with the active display area) from the bezel of the display device (e.g., TV bezel), then the system can apply intermediate glare compensation because the light sources are further away from the bezel of the display device causing a reduced level of glare. Referring to FIG. 5C, if the system detects light sources surrounding an immediate area of the active display area (e.g., less than a threshold distance in comparison with the active display area), then the system applies full glare compensation because the detected light sources are close to the bezel of the display device causing a significant level of glare.

Figure 5E:
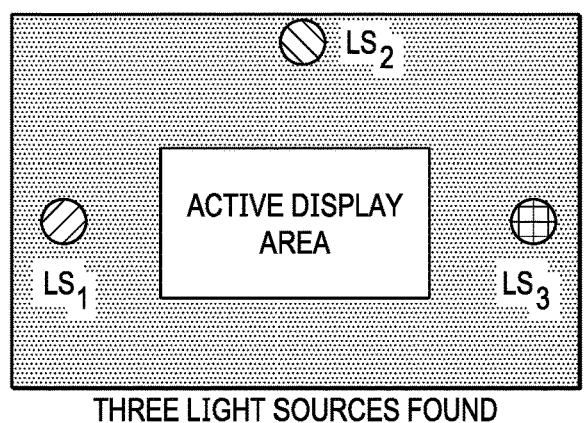
Figure 5F:
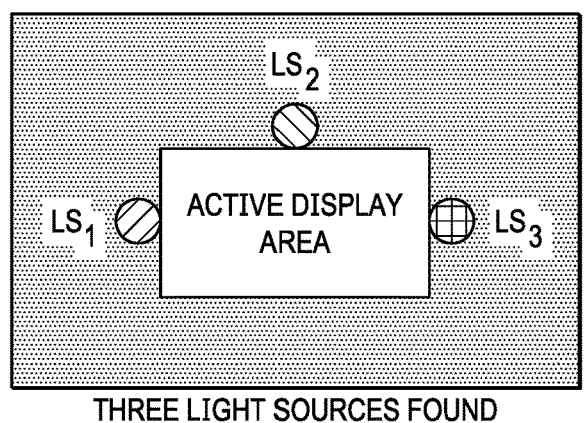

FIGS. 5D-5F can correspond to FIGS. 5A-5C respectively. Based on the image, in one embodiment, the system can create a binary image which masks clusters of pixels for light sources and active display areas. Here, the clusters of pixels can be labeled and identified as light sources LS1, LS2, and LS3 and active display area. Next, referring to FIG. 5G, the system applies a distance calculation to calculate the closest distance (e.g., glare offset) from each of the light sources to an edge of the active display area. Next, the light sources and measurement calculations can be transmitted to a display device (of the active display area) to cause the display device to apply a glare compensation algorithm based on a glare compensation model to the image/video to be displayed at the display device. The glare compensation model can be applied based on distances of the light sources to the active display area and detected intensity of the active display area. For multiple light sources, the display device can apply the algorithm for the light source closest to the active display area or an average of the light sources.

Pseudocode for the glare compensation algorithm can be as follow:

```
FUNCTION Compensate_for_glare_and_ambient_light(DistanceInPx,
    LightSourceIntensity)
    GlareOffset = GlareModel(DistanceInPx, LightSourceIntensity);
    ImgDisplayed = CompensateAmbient(GlareOffset, SrcImgIn);
END
```

In one embodiment, the glare compensation model can be applied based on a scaler distance from the light source to the active display area. In another embodiment, the glare compensation model can be applied based on a distance from the light source to the active display area, a size of the active display area, and a distance of the viewer to the active display area. Thus, the glare compensation model is to predict the perceptual fall-off of the glare in eyes of the viewers, e.g., a function of the light source intensity and a distance of the light source to the active TV area.

Figure 6B:
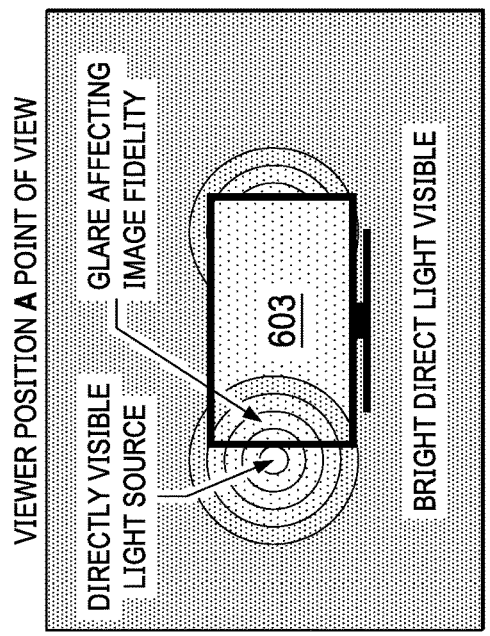
FIGS. 6A-6C illustrate examples of glare compensation based on positions of viewers according to some embodiments.
Figure 6C:
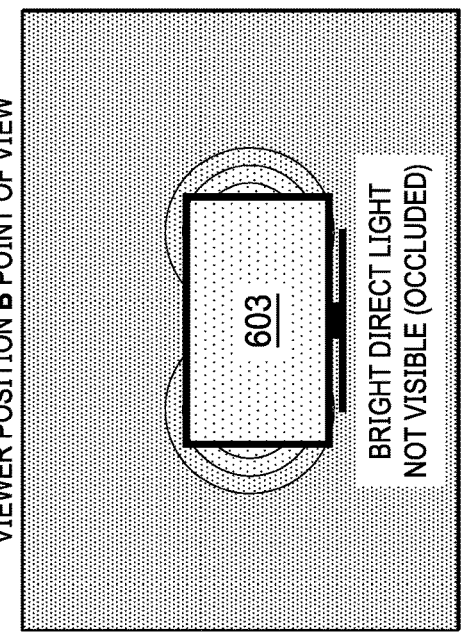
Figure 6A:
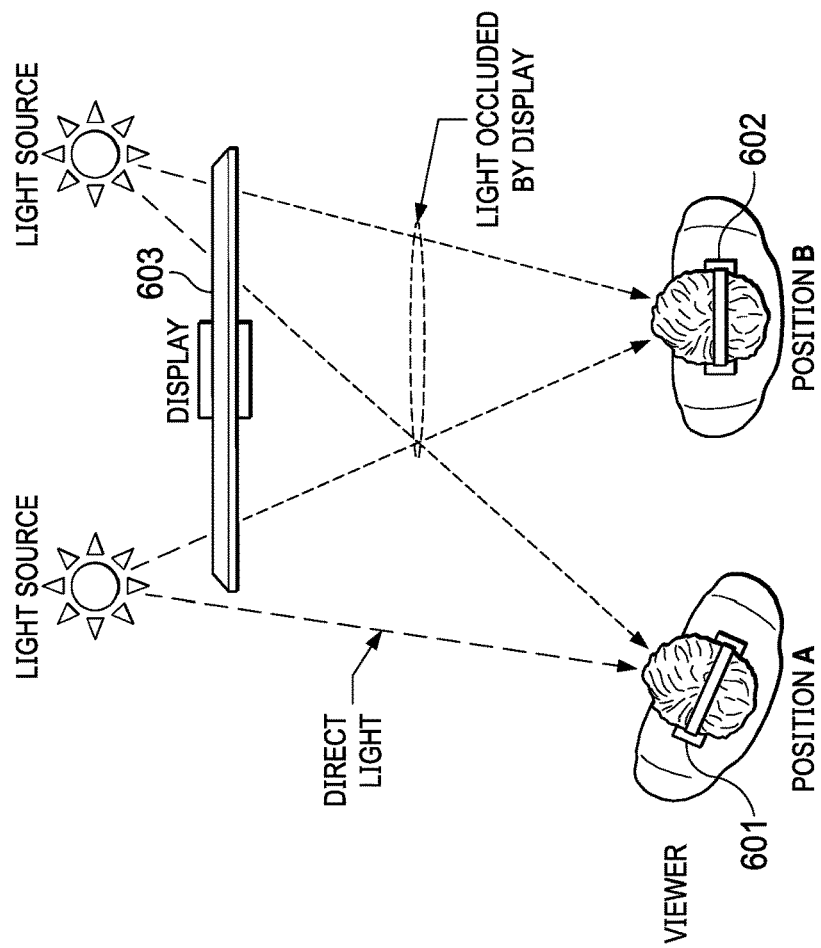

FIGS. 6A-6C illustrate examples of glare compensation based on positions of viewers according to some embodiments. In addition to light sensing and compensating for diffuse ambient light, the system light sensing system can compensate for 'sharp' highlights and emissive lights that are directly visible to a viewer. Referring to FIG. 6A, two viewers are seated at positions A and B respectively. Viewers at positions A and B wear headsets 601-602 respectively, where each of headsets 601-602 includes a light sensing system, such as light sensing system 110 of FIG. 1B. The light sensing systems of headsets 601-602 can identify field of views with locations and intensity of ambient and glare light viewable by the viewers. FIGS. 6B-6C are example point of views identified by headsets 601-602 respectively. Here, because headset 601 detects a bright glare, headset 601 can send data to display device 603 (similar to display device 102 of FIG. 1A) to notify display device 603 viewer at position A can see a glare. Similarly, headset 602 detects only ambient light and headset 602 can send data to display device 603 to inform display device 603 that viewer at position B only sees an ambient light. In response to receiving the data from headsets 601-602, display device 603 can determine that a full glare compensation is to be performed for viewer at position A because a bright light source is detected to be very close to a bezel of display device 603 causing a significant level of glare. Display device 603 can also determine that no glare compensation and/or an ambient compensation is required for viewer at position B because headset 602 did not identify any glare light sources (e.g., direct light sources are occluded). As an aggregate, because two viewers are sharing display device 603, display device 603 can perform an averaging of the compensation, and an average or desired weighting of the compensation is to be applied to the content of the display device 603 for the two viewers, e.g., half glare compensation with ambient compensation is to be applied to content displayed on display device 603 for the two viewers. Although FIGS. 6A-6C only shows two viewers, any number of viewers can be supported.

Figure 7A:
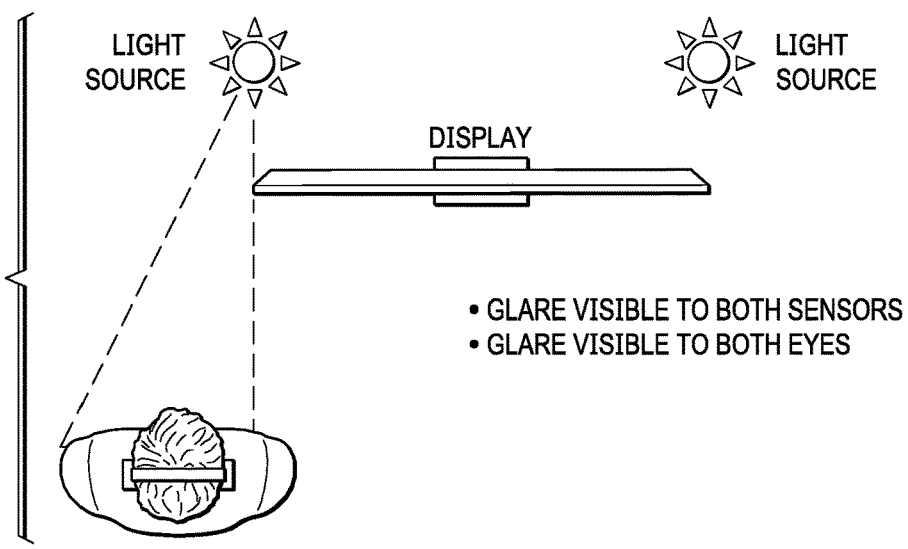
FIGS. 7A-7C illustrate an example of sensor occlusion detection based on a motion vector according to one embodiment.
Figure 7B:
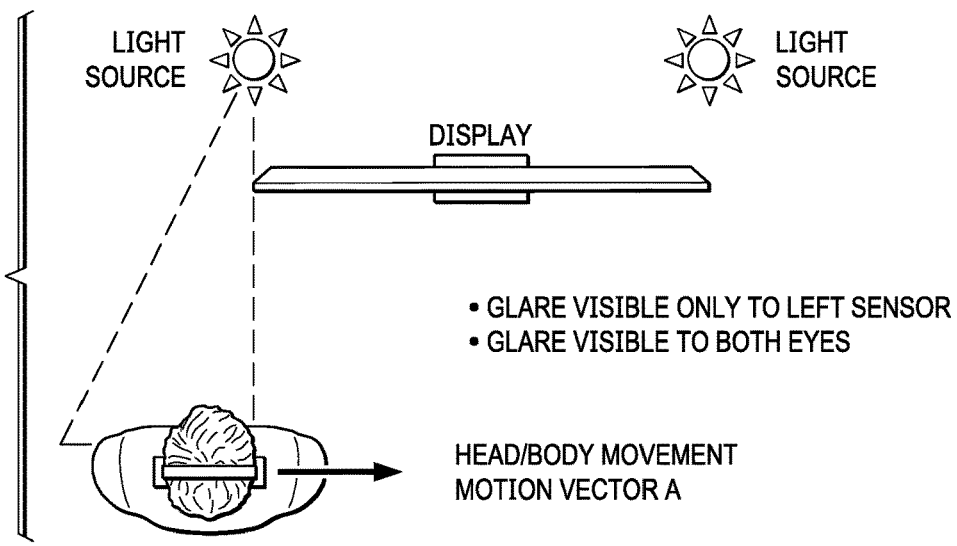
Figure 7C:
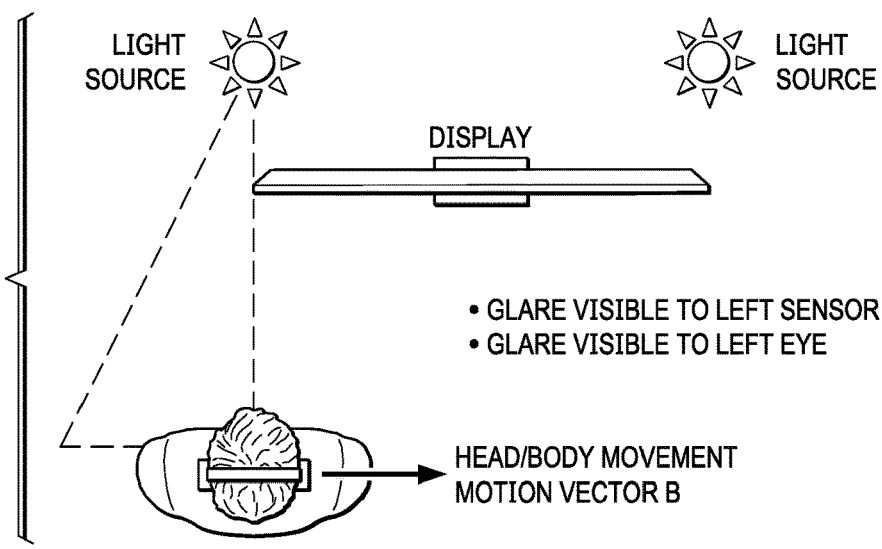

FIGS. 7A-7C illustrate examples of sensor occlusion detection based on a motion vector according to one embodiment. A motion vector can improve an accuracy of glare occlusion detection for a headset heaving a light sensing system. Typically, a light sensor mounted on a headphone is further outwards compared to the eyes of a viewer. As the viewer adjusts his/her viewing position, a light source detected by the sensor is occluded (or obstructed) from the sensor before it is occluded from the eyes of the viewer. FIGS. 7A-7C can illustrate this concept. Referring to FIG. 7A, a viewer wears a headset with a light sensing system, similar to system 110 of FIG. 1B. The light sensing system includes a left and a right light sensors to the left and right eyes of the viewer respectively. The viewer can initially see with both eyes, and both left and right light sensors can initially detect, a light source. Referring to FIG. 7B, as the viewer moves to the right, the light source (e.g., glare) is no longer detectable by the right sensor. Here, only the left sensor can detect the light source and the light source is viewable by both eyes of the viewer. As the user moves to the right, as shown in FIG. 7C, the light source is only detectable by the left sensor and the light source is now only viewable by the left eye of the viewer.

Based on the above observation, the headset can measure a motion vector of the headset (e.g., by an IMU, MEMS, accelerometer and/or gyroscope sensors of the light sensing system) to assess a position of the viewer to determine if the viewer has moved. The headset next determines if both sensors senses a glare light source. If yes, then the system sends data to display device to instruct the display device to apply a full glare compensation. If only one sensor senses a bright light source, then the system determines if at least an eye of the viewer can view the light source. If both sensors are occluded, then the system determines that no glare compensation is required. Here, FIGS. 7A-7C illustrate an example for a right eye only but similar concepts can be applied to a left eye of an viewer.

Figure 8:
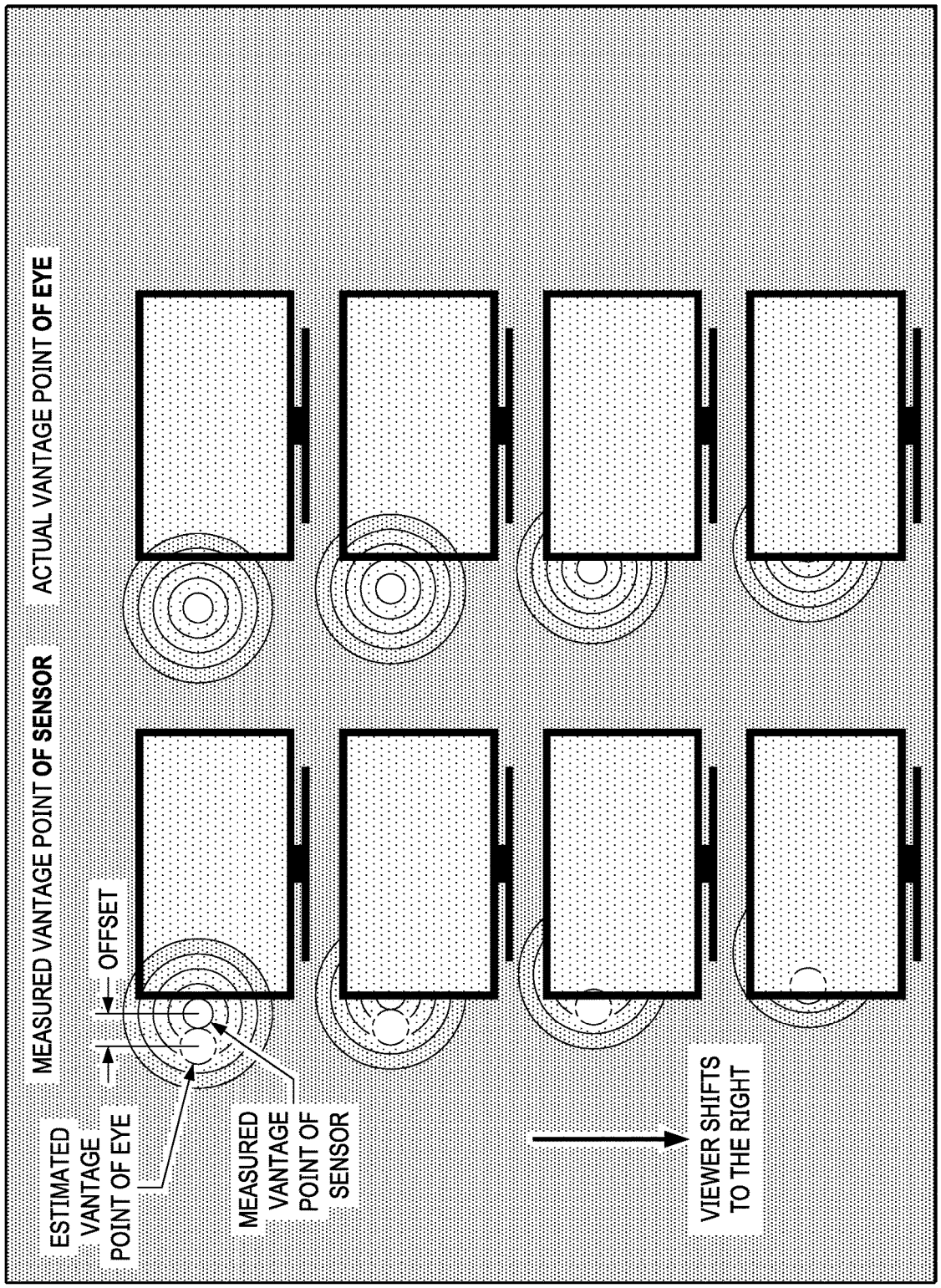
FIG. 8 illustrates examples of a measured vantage point of sensor and an estimated vantage point of eye according to one embodiment.

FIG. 8 illustrates examples of a measured vantage point of sensor and an actual vantage point of eye according to one embodiment. The concept of FIG. 8 is to illustrate if a light source behind a display device (e.g., TV) is visible from a given vantage point, e.g., a point of view or a position or standpoint from which a light source is viewed. As there is an offset between a sensor and an eye of the viewer, a vantage point of eye needs to be estimated because a light source can be visible to a viewer's eye, even if it is not sensed by a sensor. When one or more sensors senses a bright light source, the system should be able to determine if a light source is viewable to none, only one, or both eyes of the viewer using vantage points estimations/measurements techniques. Here, an actual vantage point of eye refers to a field of view actually viewable by an eye of the viewer. A measured vantage point of sensor refers to a field of view of a sensor. An estimated vantage point of eye refers to an estimated field of view by an eye of the viewer. The measured vantage points of sensor can be measured based on positions of the one or more sensors, and the vantage point of eye can be estimated (e.g., dotted circle) based on the measured vantage point of sensor and an offset of the sensors to an estimated position of the eyes of the viewers.

Referring to FIG. 8, a light source for a given measured vantage point of sensor and an actual vantage point of eye for a viewer is illustrated side-by-side, for a right sensor/eye pair. Referring to the vantage point of sensor, a dotted circle represents an estimated position for the vantage point of eye. Here, the distance between a measured vantage point of sensor and the estimated vantage point of eye can be calculated based on a distance from the viewer to the display device, and a distance between the sensor and eye of the viewer. For example, the estimated light source (dotted circle) can be computed and projected onto a plane of the display device, where a position of the estimated light source is computed based on positional distances of a sensor to an eye, and a viewing distance to the display device. Note that the estimated vantage point of eye is dynamic as the user moves. As the viewer moves a distance to the right, the estimated position for the vantage point of eye shifts to the right (as illustrated by the estimated vantage point of eye shifting to the right). The estimated vantage point of eye can then be used by a display algorithm to determine if a light source is viewable by the viewer's eye. The similar can be estimated for the right or left sensor/eye pair.

Figure 9A:
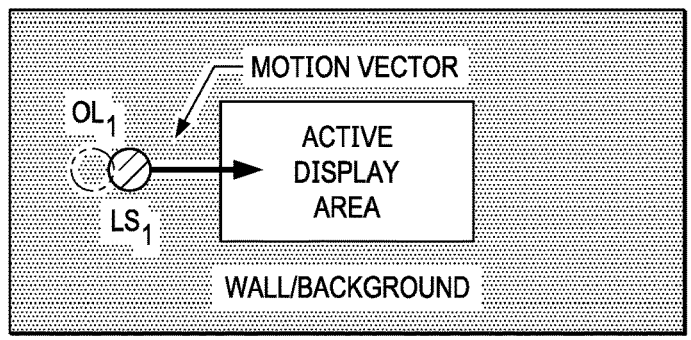
FIGS. 9A-9B illustrate an example of illumination compensation according to some embodiments.
Figure 9B:
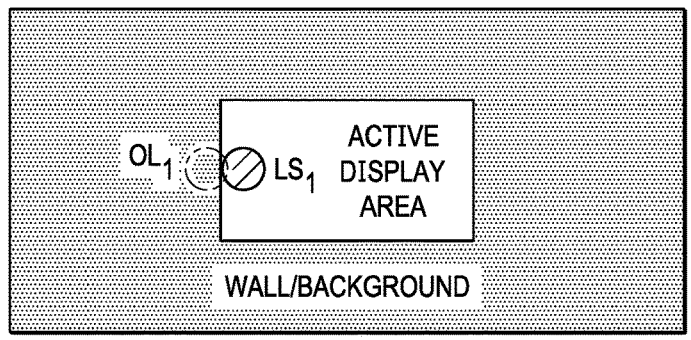

FIGS. 9A-9B illustrate an example of illumination compensation according to some embodiments. Referring to FIGS. 9A-9B, light source 1 (LS1) represents a light source detected by a light sensor from a headset of a viewer and OL1 represents an offset to the LS1, representing an offset from an estimated vantage point of eye to a measured vantage of sensor for the light source. Referring to FIG. 9A, a sensor (e.g., right sensor) of the headset can sense LS1, and a motion vector represents the viewer is adjusting his/her viewing position. Here, the viewer moved a distance to the right. Referring to FIG. 9B, where the vantage point of sensor no longer detects LS1, based the motion vector, the system determines if the light source LS1 is occluded from the sensor or covered by a surface area of the display device (e.g., TV). If not, then a glare compensation is applied. If yes, the system determines if the LS1, occluded from the sensor, is viewable by the viewer based on an offset distance estimated from the right pupil (e.g., right eye) of the viewer to the sensor. If yes then a glare compensate is applied.

An example pseudocode of compensation can be as follows:

```
WHILE Displaying_Content
    LS1 = GetPosition_of_LS( )
        IF LS1 == occluded from the sensor
        (compared to previous measurement)
            EyePosition = LastLightSourcePos – EyeOffset
            IF EyePosition == occluded by TVarea
                No_Compensate_for_glare_and_ambient_light( )
            ELSE
                Compensate_for_glare_and_ambient_light( )
            END
        ELSE
            Compensate_for_glare_and_ambient_light( )
        END
END
```

Although only a right sensor and eye is illustrated, similar concept can be applied to the left sensor/eye.

Figure 10:
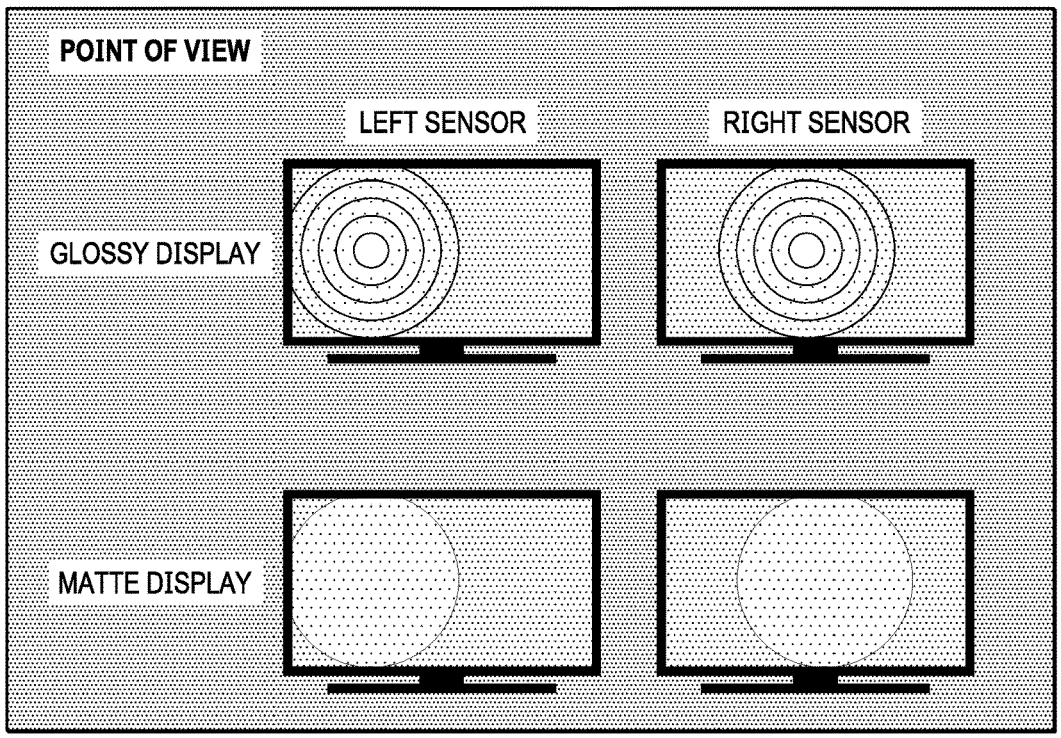
FIG. 10 illustrates an example of detecting display and environment properties using an active light source according to one embodiment.

FIG. 10 illustrates an example of detecting display and environment properties using an active light source according to one embodiment. In one embodiment, a headset mounted light sensing system such as system 110 of FIG. 1B can include an active light source. The active light source can switch on and off for light sensing system and/or display device calibration. The active light source can also be used to calibrate light sensor(s) of the display device. For example, the active light source can be used to identify properties of a display surface of the display device (e.g., glossiness level, distance to viewer). The active light source can also calibrate reflectance properties of background, if the properties of the active light source in the headset are predetermined. Examples of active light sources can be light emitting diodes (LED), incandescent light, or any combination of electric light sources. Referring to FIG. 10, to identify the reflection properties (e.g., a matte or a glossy display) of a display device, the light sensing system can activate the active light source to generate a glare reflection off the display device. A sensed peak luminance can be calculated from the reflection. The reflective properties can be identified analyzing a gradient fall-off surrounding the peak luminance. For example, a sharp gradient fall-off can indicate a high level of gloss for the display. Here, a glossy display would have a sharper gradient drop-off than a matte display.

Figure 11:
FIG. 11 illustrates an example of a panoramic view according to one embodiment.

FIG. 11 illustrates an example of a panoramic view according to one embodiment. Referring to FIG. 11, if light sensors in a headset/HMD can capture a wide angle view or panorama of the room, including the display device (TV as shown), then a directional information may be determined for the ambient light source. Thus, by capturing an angle to the surface of the TV, the direction of the ambient light can be taken into account for ambient light compensation.

Figure 12A:
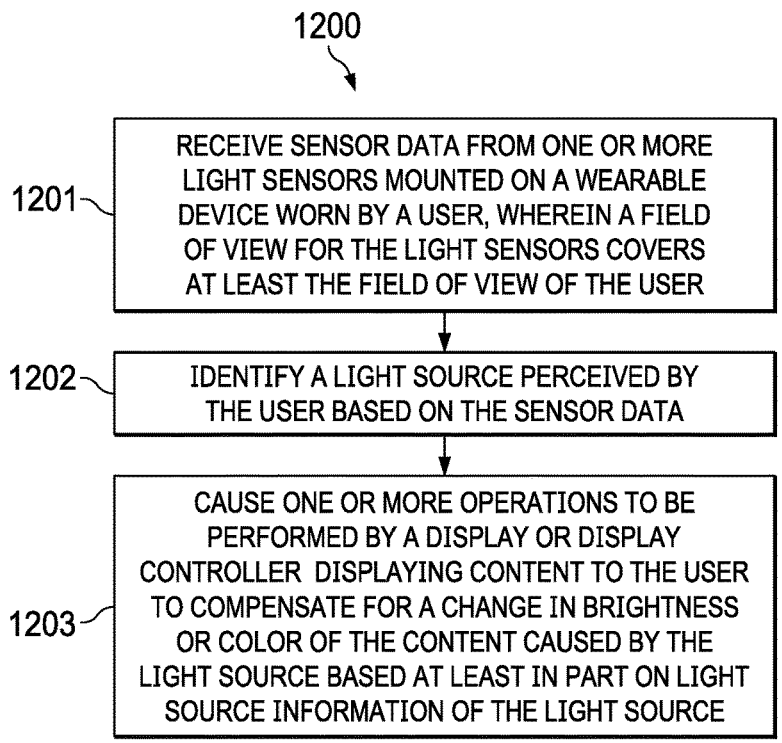
FIGS. 12A-12C are flowcharts that illustrate one or more methods according to some embodiments.
Figure 12C:
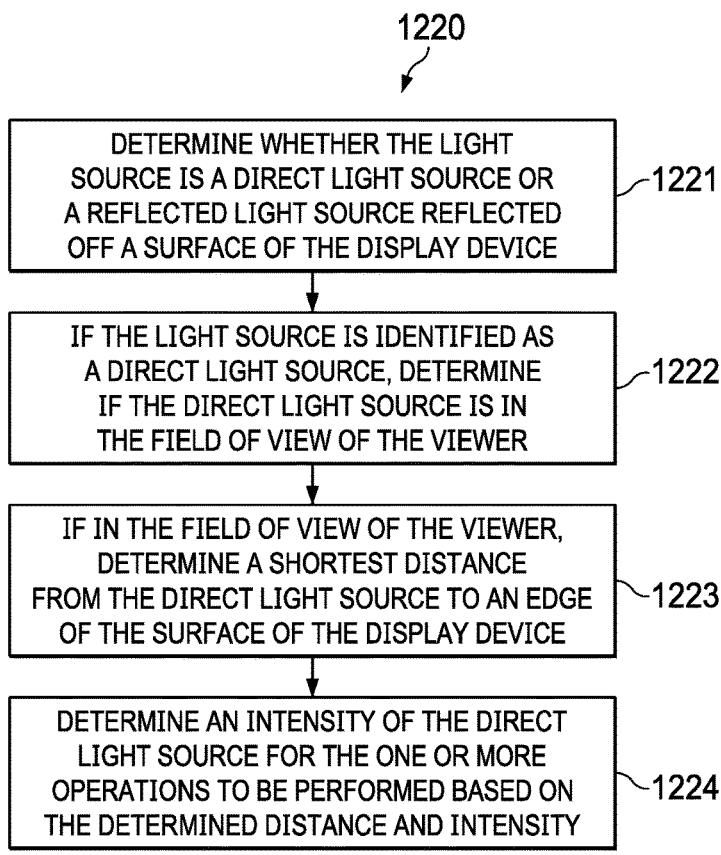
Figure 12B:
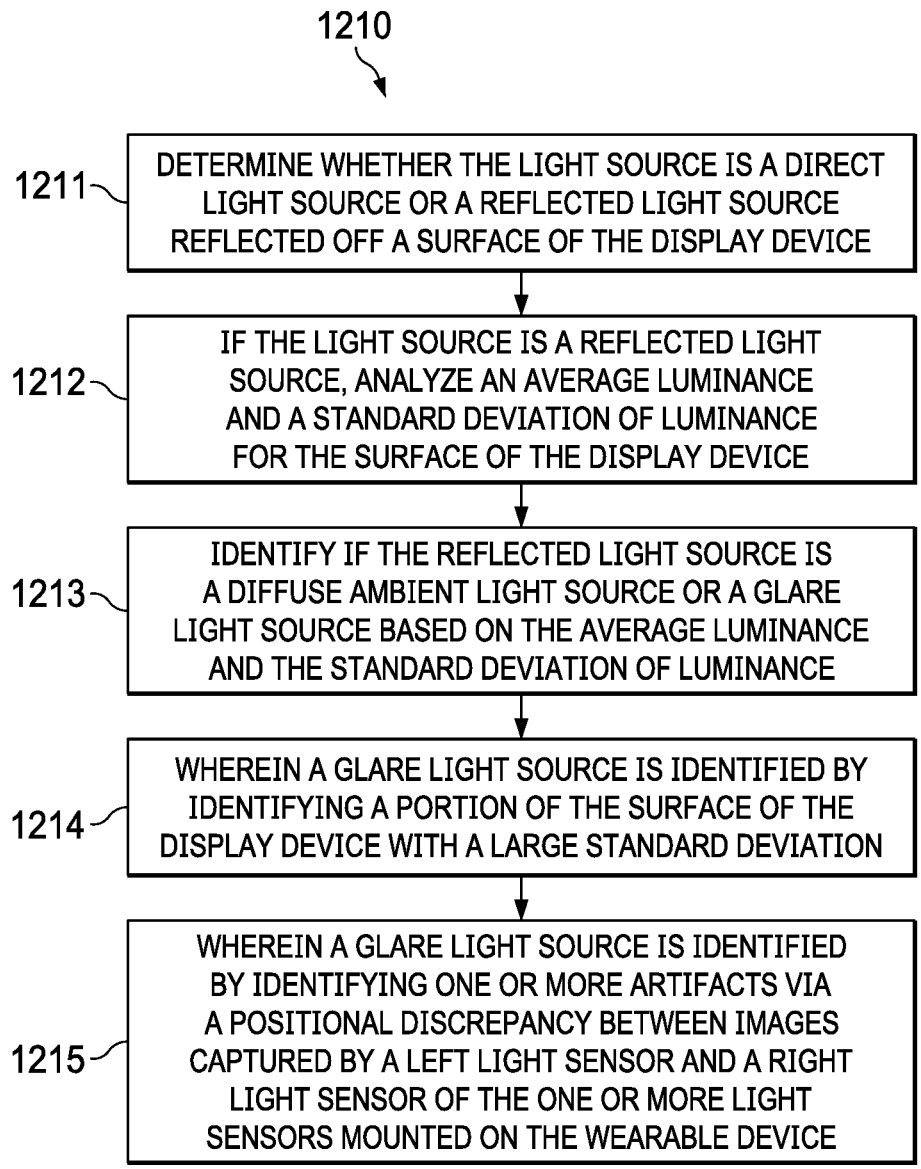

FIGS. 12A-12C are flowcharts that illustrate one or more methods according to some embodiments. Referring to FIGS. 12A-12C, processes 1200, 1210, and/or 1220 may be performed by processing logic which may include software, hardware, or a combination thereof. For example, processes 1200, 1210, and/or 1220 may be performed by light sensing system 110 of FIG. 1B. Referring to FIG. 12A, at block 1201, processing logic receives sensor data from one or more light sensors mounted on a wearable headset worn by a viewer of a display device in a room, where a field of view for the light sensors covers a field of view of the viewer. At block 1202, processing logic identifies a light source perceived as being in a field of view of the viewer based on the sensor data. At block 1203, processing logic transmits data for one or more operations to be performed by the display device displaying content to the viewer to compensate for a change in brightness or color of the content caused by the light source based at least in part on light source information of the light source.

In one embodiment, processing logic tracks a change in luminance of the light source over a predetermined period of time to determine whether the change in luminance is gradual or abrupt. Processing logic determines a potential source for the light source using a deterministic algorithm based on the tracked changes.

Referring to FIG. 12B, at block 1211, processing logic determines whether the light source is a direct light source or a reflected light source reflected off a surface of the display device. In one embodiment, processing logic first determines a location for a surface of the display device and then determines a location of the light source to determine if the light source is a direct light source or a reflected light source. At block 1212, if the light source is a reflected light source, processing logic analyzes an average luminance and a standard deviation of luminance for the surface of the display device. At block 1213, processing logic identifies if the reflected light source is an ambient light source or a glare light source based on the average luminance and the standard deviation of luminance. At block 1214, in one embodiment, a glare light source is identified by identifying a portion of the surface of the display device with a large standard deviation of luminance. At block 1215, in one embodiment, a glare light source is identified by identifying one or more artifacts via a positional discrepancy between images captured by a left light sensor and a right light sensor of the one or more light sensors mounted on the wearable headset.

In one embodiment, if the light source is a reflected light source, processing logic identifies whether the light source is controllable. If the light source is controllable, processing logic controls a brightness of the light source to compensate for the light source if the light source is controllable. If the light source is not controllable or if no change is detected from the display screen after the controlling, processing logic suggests a change in a viewing position to the viewer. In another embodiment, determining if the light source is controllable includes automatically detecting internet of things (IOT) based light sources for the room over a local network and registering each of the detected light sources as a controllable light source. In another embodiment, the one or more light sensors mounted on the wearable headset worn by the viewer includes a left and a right light sensor to a left and a right side of a left and a right eye of the viewer respectively.

Referring to FIG. 12C, at block 1221, processing logic determines whether the light source is a direct light source or a reflected light source reflected off a surface of the display device. At block 1222, if the light source is identified as a direct light source, processing logic determines if the direct light source is in the field of view of the viewer. At block 1223, if in a field of view of the viewer, processing logic determines a shortest distance from the direct light source to an edge of the surface of the display device. At block 1224, processing logic determines an intensity of the direct light source for the one or more operations to be performed based on the determined distance and intensity.

In one embodiment, if there are two or more viewers, the one or more operations is to be performed based on an average intensity perceived as being in a field of view for each of the two or more viewers. In another embodiment, processing logic determines if the direct light source is in a field of view of a left, a right, or both eyes of the viewer wearing the headset based on images captured by a left and a right light sensor of the one or more light sensors mounted on the wearable headset.

In another embodiment, if the left and right light sensors both perceive a direct light source, processing logic determines that the direct light source is visible to both eyes of the viewer. In another embodiment, if only one of the left or the right light sensor, but not both, senses a direct light source, processing logic determines a vantage point of eye for the viewer based on a measured vantage point of sensor, and a distance offset from the sensor to the eye of the viewer being projected a distance from the headset to the surface of the display device. Processing logic determines if the vantage point of eye is outside the surface of the surface of the display device. If it is outside, processing logic determines that the direct light source is not visible to both eyes.

In another embodiment, processing logic determines a motion vector of the headset based on a motion sensor mounted on the headset. Processing logic determines, based on the vantage point of eye, the direct light source is occluded by a surface of the display device based on the motion vector.

In one embodiment, the one or more operations to be performed by the display device includes adjusting a black level displayed by the display device, and/or adjusting a tone mapping characteristic of the display device. In one embodiment, the one or more operations to be performed by the display device include notifying a viewer to take a manual action to compensate for a non-controllable glare light source. In another embodiment, the one or more sensors include one or more light transducers or image capturing devices. In one embodiment, transmitting the data for one or more operations to be perform by the display device causes the display device to look up an entry in a look up table (or parametric adjustment parameters) for one or more operations to be perform based on a type of the light source to cause the one or more operations to be performed.

Figure 13:
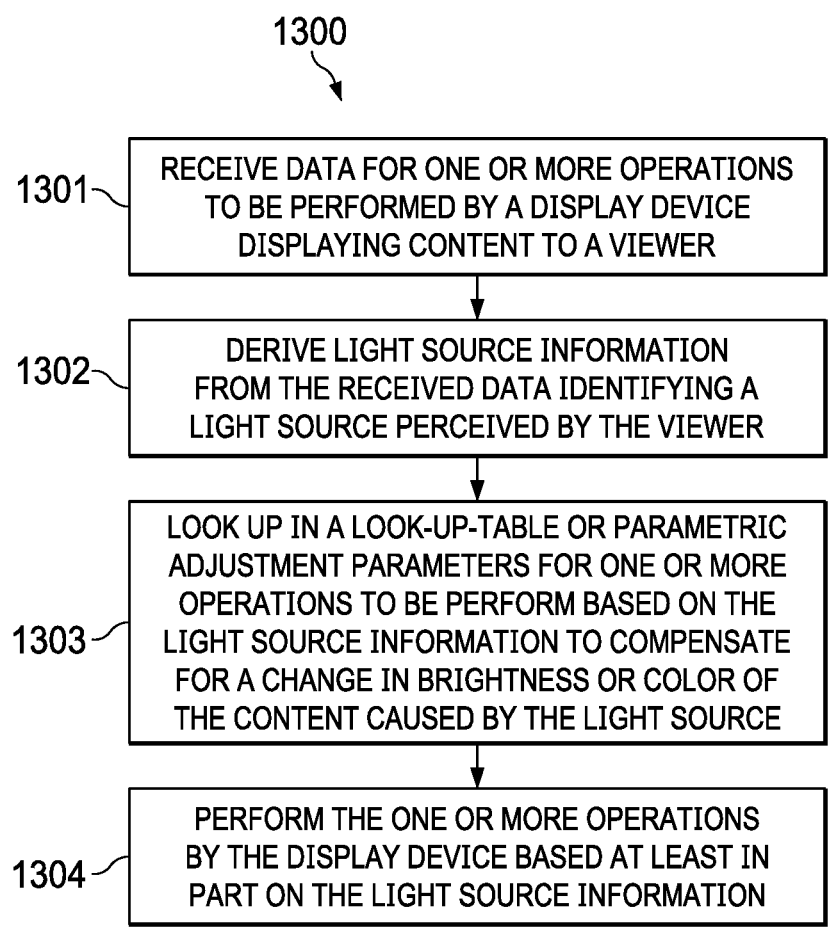
FIG. 13 is a flowchart that illustrates a method according to some embodiments.

FIG. 13 is a flowchart that illustrates a method according to some embodiments. Referring to FIG. 13, process 1300 may be performed by processing logic which may include software, hardware, or a combination thereof. For example, process 1300 may be performed by a display device 102 of FIG. 1A. Referring to FIG. 13, at block 1301, processing logic receives data for one or more operations to be performed by a display device displaying content to a viewer. At block 1302, processing logic derives (or retrieves) light source information from the received data identifying a light source perceived as being in a field of view of the viewer. At block 1303, processing logic looks up in a look-up-table for one or more operations to be performed based on the light source information to compensate for a change in brightness or color of the content caused by the light source. At block 1304, processing logic performs the one or more operations based at least in part on the light source information.

Figure 14A:
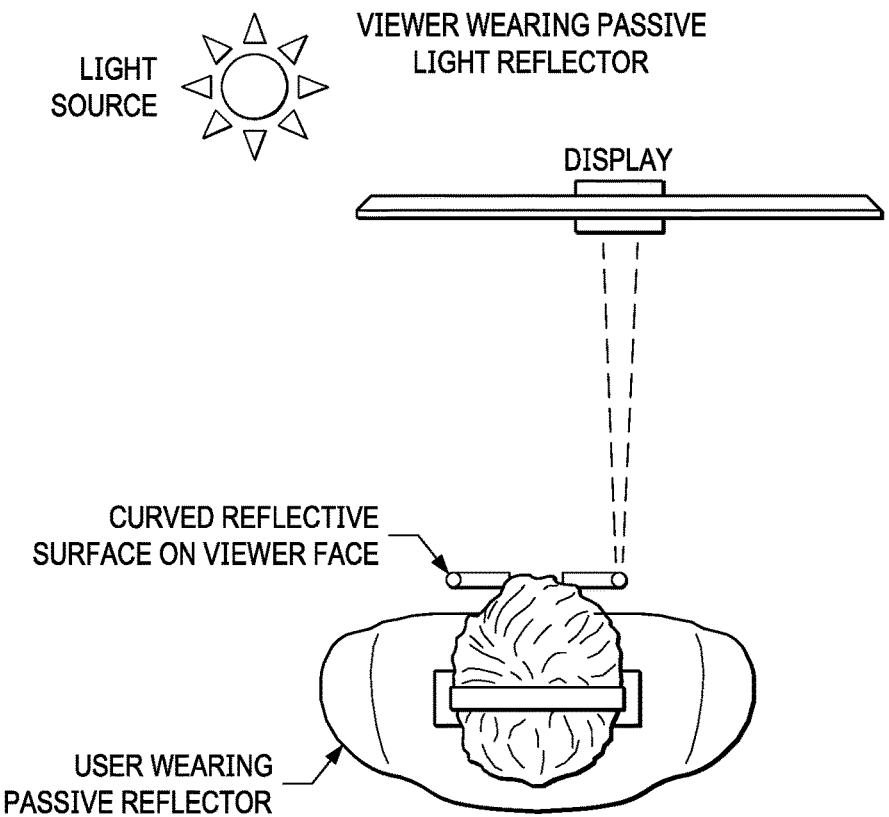
FIGS. 14A-14C illustrate a user/viewer wearing a passive reflector according to some embodiments.
Figure 14D:
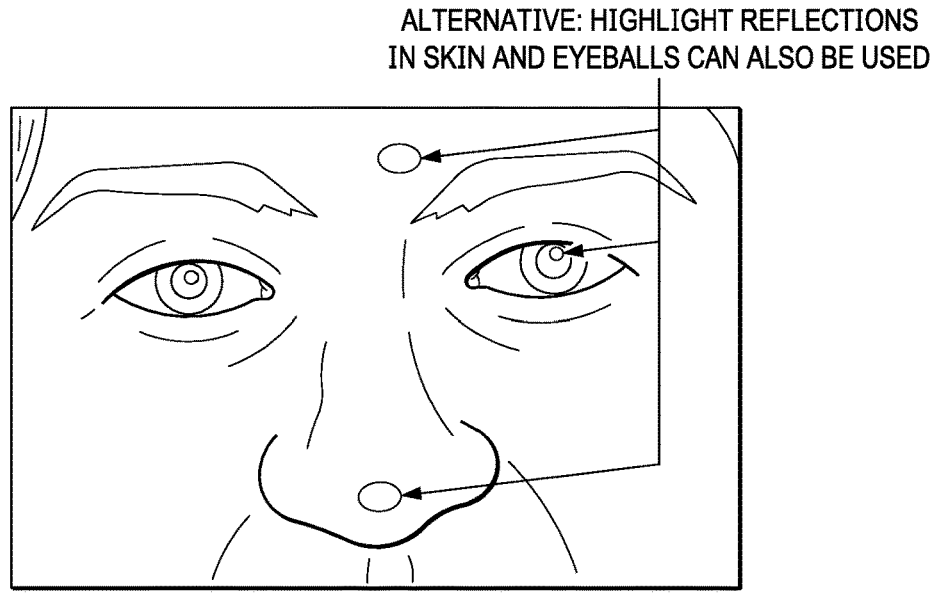
FIG. 14D illustrates highlight reflections on skin and eyeballs according to an embodiment.
Figure 14C:
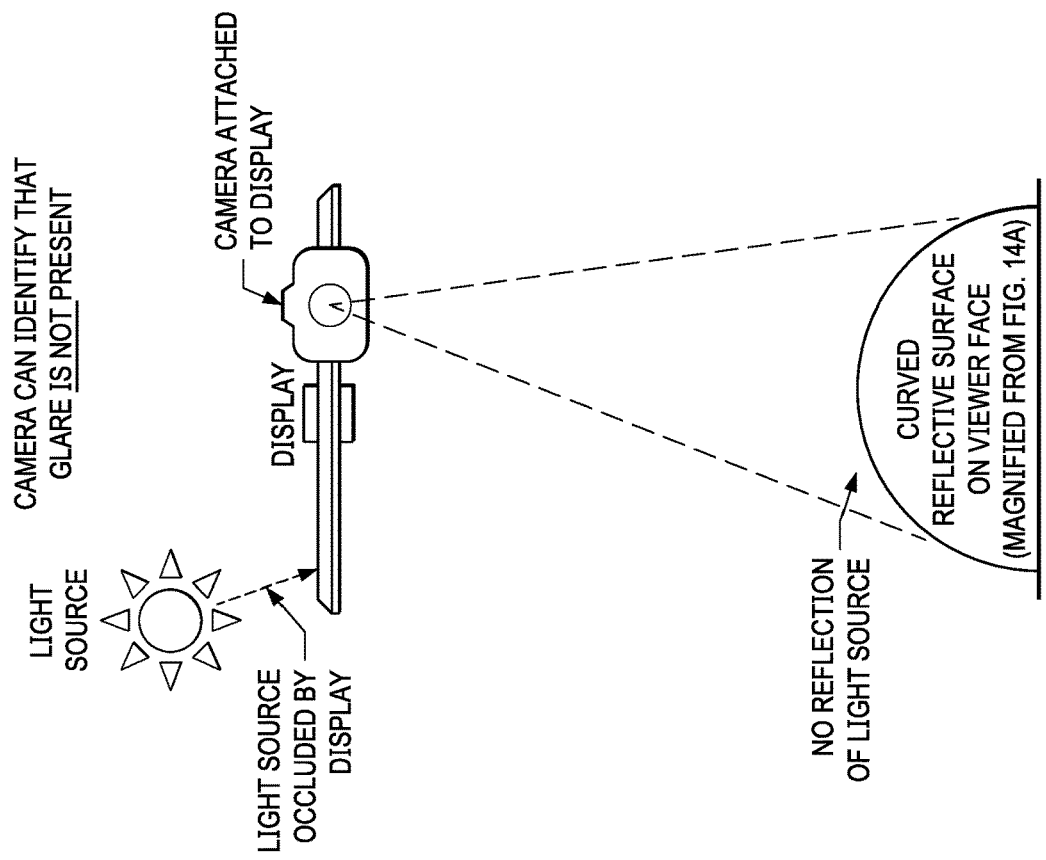
Figure 14B:
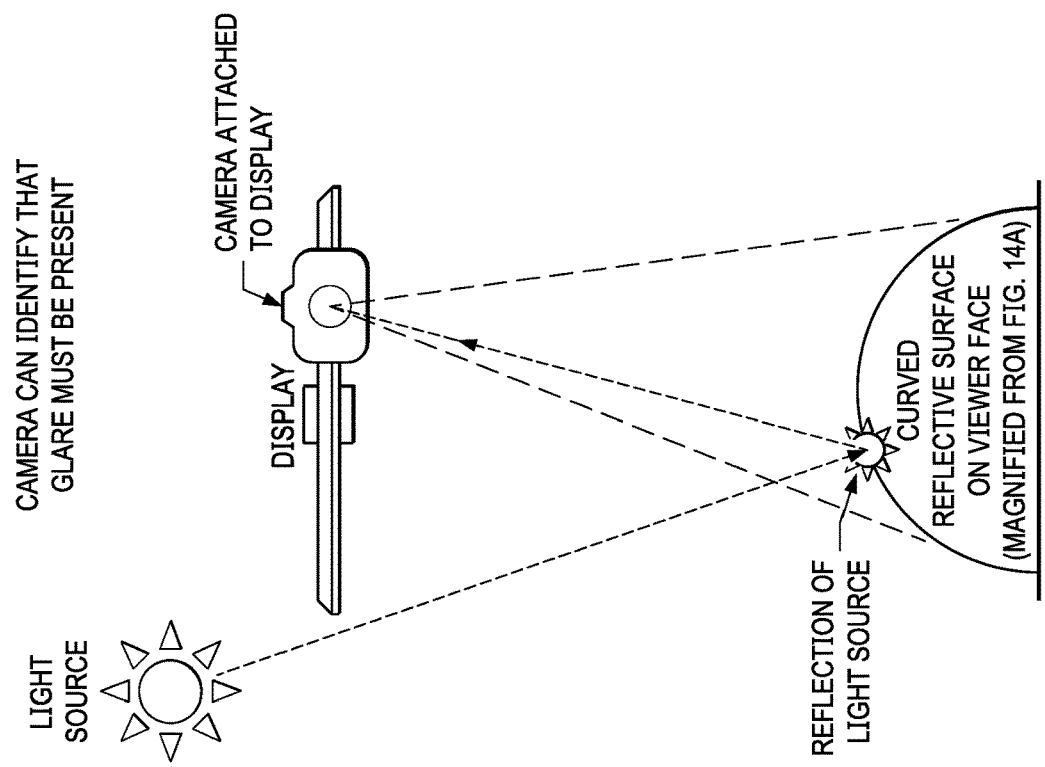

FIGS. 14A-14C illustrate a user/viewer wearing a passive reflector according to some embodiments. Referring to FIGS. 14A-14C, a viewer does not have to carry any electronics or other active equipment for glare detection. Instead, if glare is visible from a point of view of the viewer, the glare can be assessed by an image/video captured by a camera (e.g. in the TV) to analyze reflections in a reflective surface (passive reflector wore by the viewer or a surface (forehead, cheek, nose, etc.) of a face of the viewer) close to the viewer's eyes. In one embodiment, the viewer wears a passive reflector having a reflective surface resembling a mirrored half dome several magnitudes smaller. Note that a mirrored half dome is a security mirror at hallway intersections, entrances to see around corners. Here, a camera attached to a display device (e.g., TV) can track a face (and eye) of the viewer (e.g. via face detection or eye tracking algorithms) The display device can then identify if there is a significant reflection coming from the reflector.

If the viewer can perceive e.g. a light source behind the screen causing glare, this light source will also reflect off the passive reflector. If the light source is not visible, then the light source should not be reflected in the passive reflector. In one embodiment, the display device can analyze (or assess) the reflection to determine if the light source is a glare or an ambient light source. In one embodiment, the display device can notify the viewer that the display device will be switched off or to low luminance for the duration of glare assessment. If the assessment has a long duration, the display device may separate lights being part of the content displayed (which changes over time) from active lights in the viewers ambient (which does not change over time) for glare assessment. In one embodiment, the position of the light source can also be assessed based on the position of the reflection on the surface of the passive reflector. Based on the assessment, the display device can perform some remedial operations (as discussed above) to compensate for a change in brightness or color of the content caused by the light source.

In some embodiments, the passive reflector can be any kind of surface, e.g., reflections from non-hemispheric surfaces can be used (e.g. a glossy glasses frame, watches, jewelry, etc.). In another embodiment, the viewer does not necessarily wear any types of reflectors, rather, a surface of a portion of a face of the viewer can act as a passive reflector. FIG. 14D illustrates highlight reflections on skin and eyeballs of a face of the viewer according to an embodiment. Referring to FIG. 14D, reflections of the skin (such as forehead) and eyeballs can be used to assess a direction and intensity of the glare.

In various example embodiments, an apparatus, a device, a system, a display management system, a display controller, or one or more other computing devices performs any or a part of the foregoing methods as described. In an embodiment, a non-transitory computer readable storage medium stores software instructions, which when executed by one or more processors causes performance of a method as described herein.

Note that, although separate embodiments are discussed herein, any combination of embodiments and/or partial embodiments discussed herein may be combined to form further embodiments.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
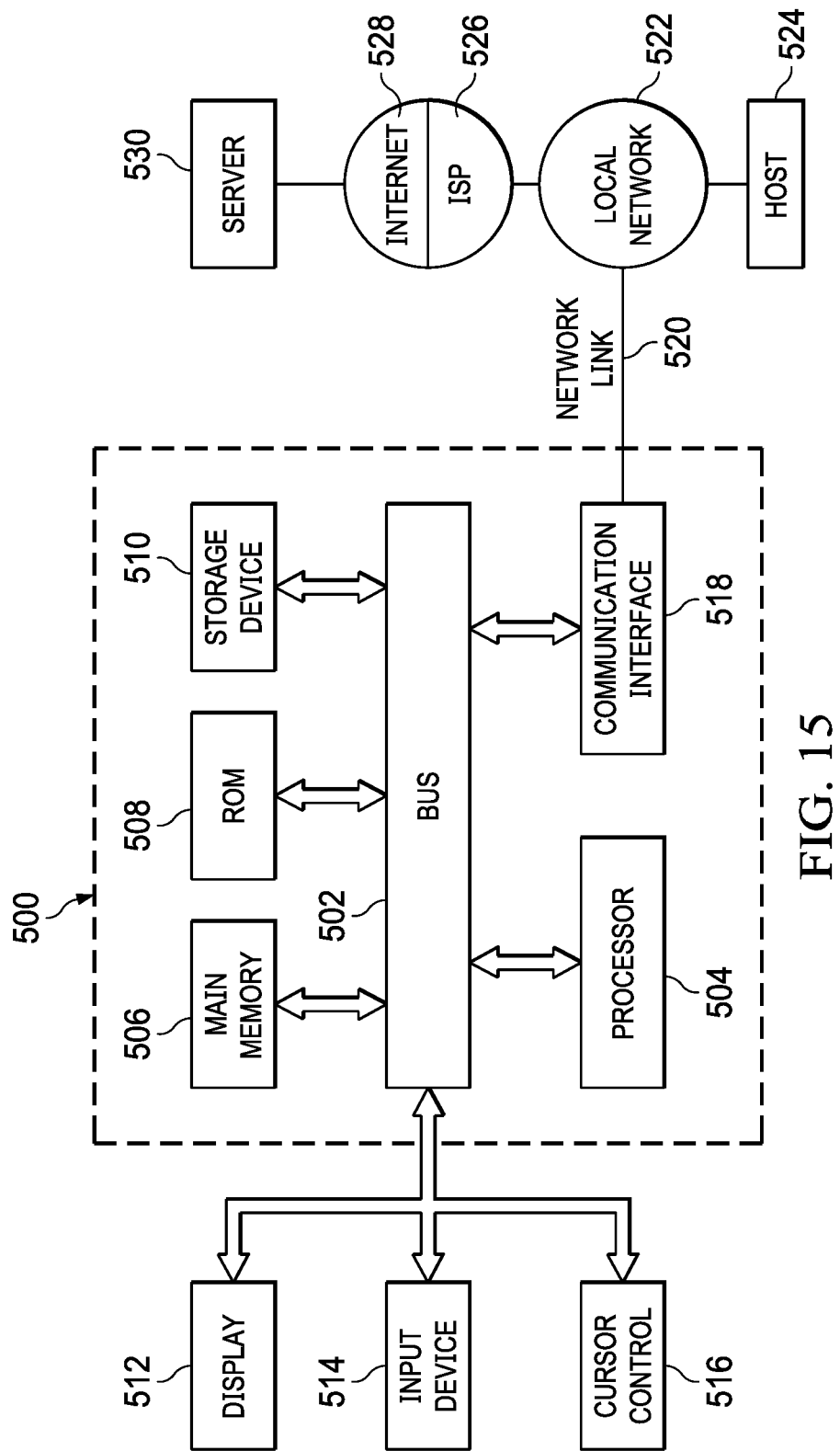
FIG. 15 shows an example of a data processing system.

For example, FIG. 15 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The following exemplary embodiments (each refer to as an "EE") are described.

EE 1. A method to identify a light source, the method comprising: receiving sensor data from one or more light sensors mounted on a wearable device worn by a viewer of a display device in a room, wherein a field of view for the light sensors covers at least a field of view of the viewer;
identifying a light source in a field of view of the viewer based on the sensor data; and
transmitting data for one or more operations to be performed by a display controller of the display device displaying content to the viewer to compensate for a change in brightness or color of the content caused by the light source based at least in part on light source information of the light source.

EE 2. The method of EE 1, further comprising:
determining whether the light source is a direct light source or a reflected light source reflected off a surface of the display device by
determining a location for a surface of the display device; and
determining a location of the light source to determine if the light source is a direct light source or a reflected light source.

EE 3. The method of EE 1 or EE 2, further comprising:
tracking a change in luminance of the light source over a predetermined period of time to determine whether the change in luminance is gradual or abrupt; and
determining a potential source for the light source using a deterministic algorithm based on the tracked changes.

EE 4. The method of EE 3, further comprising:
if the light source is a reflected light source, analyzing an average luminance and a standard deviation of luminance for the surface of the display device; and
identifying if the reflected light source is a diffuse ambient light source or a glare light source based on the average luminance and the standard deviation of luminance.

EE 5. The method of EE 4, wherein a glare light source is identified by identifying a portion of the surface of the display device with a large standard deviation of luminance.

EE 6. The method of EE 4, wherein the glare light source is identified by identifying one or more artifacts via a positional discrepancy between images captured by a left light sensor and a right light sensor of the one or more light sensors mounted on the wearable device or a temporal discrepancy between two or more images of a light sensor of the wearable device.

EE 7. The method of any of EEs 3-6, further comprising:
if the light source is a reflected light source, identifying whether the light source is controllable; and
if the light source is controllable, controlling a brightness of the light source to compensate for the light source if the light source is controllable; and if the light source is not electronically controllable or if no change is detected from the display screen after the controlling, suggesting a manual control by the viewer if controlling the light source is beyond the power of the viewer, suggest a change in a viewing position to the viewer.

EE 8. The method of EE 7, wherein determining if the light source is controllable comprises:

automatically detecting internet of things (JOT) based light sources for the room over a local network; and registering each of the detected light sources as a controllable light source.

EE 9. The method of EE 8, wherein the one or more light sensors mounted on the wearable device worn by the viewer includes a left and a right light sensor to a left and a right side of a left and a right eye of the viewer respectively.

EE 10. The method of any of EEs 3-9, further comprising:

if the light source is identified as a direct light source, determining if the direct light source is in the field of view of the viewer;

if in a field of view of the viewer, determining a shortest distance from the direct light source to an edge of the surface of the display device;

determining an intensity of the direct light source for the one or more operations to be performed based on the determined distance and intensity.

EE 11. The method of EE 10, if there are two or more viewers, the one or more operations is to be performed based on an average or weighted intensity perceived as being in a field of view for each of the two or more viewers.

EE 12. The method of EE 10 or EE 11, further comprising:

determining if the direct light source is perceived in a field of view of a left, a right, or both eyes of the viewer wearing the wearable device based on images captured by a left and a right light sensor of the one or more light sensors mounted on the wearable device.

EE 13. The method of EE 12, further comprising:

if the left and right light sensors both sense a direct light source, determining that the direct light source is visible to both eyes of the viewer.

EE 14. The method of EE 12, further comprising:

if only one of the left or the right light sensor, but not both, senses a direct light source, determining a vantage point of eye for the viewer based on a measured vantage point of sensor, and a distance offset from the sensor to the eye of the viewer being projected a distance from the wearable device to the surface of the display device;

determining if, based on the vantage point of eye, the light source is occluded by the surface of the display device; and if it is determined to be occluded, determining that the direct light source is not visible to both eyes.

EE 15. The method of EE 14, further comprising:

determining a motion vector of the wearable device based on a motion sensor mounted on the wearable device; and determining, based on the vantage point of eye, the direct light source is occluded by the surface of the display device based on the value of the motion vector.

EE 16. The method of any of EEs 1-15, wherein the one or more operations to be performed by the display device comprise:

adjusting a black level displayed by the display device; and adjusting a tone mapping characteristic of the display device.

EE 17. The method of any of EEs 1-16, wherein the one or more operations to be performed by the display device comprise notifying a viewer to take a manual action to compensate for a non-controllable glare light source.

EE 18. The method of any of EEs 1-17, wherein the one or more sensors include one or more light transducers, image or video capturing devices.

EE 19. The method of any of EEs 1-18, wherein transmitting the data for one or more operations to be perform by the display device causes the display device to look up an entry in a look up table or parametric adjustment parameters for one or more operations to be perform based on a type of the light source to cause the one or more operations to be performed.

EE 20. The method of any of EEs 1-19, wherein the wearable device includes a wearable headset.

EE 21. A non-transitory machine readable medium storing instructions which when executed by a wearable device cause the wearable device to perform a method as in any one of EEs 1-20.

EE 22. A wearable device which includes a memory and a processing system configured to perform a method as in any one of EEs 1-20.

EE 23. A method to compensate for a light source, the method comprising:

receiving data from a wearable device of a viewer for one or more operations to be performed by a display management of a display device to display content to the viewer;

retrieving light source information from the received data identifying a light source perceived in a field of view of the viewer;

looking up in a look-up-table or a parametric table for one or more operations to be performed based on the light source information to compensate for a change in brightness or color of the content caused by the light source; and performing the one or more operations based at least in part on the light source information.

EE 24. A method to identify a light source, the method comprising:

receiving sensor data from one or more light sensors mounted on or close to a display device in a room, wherein the one or more light sensors is directed at a viewer viewing the display device;

identifying a reflection for a light source on a passive surface of the viewer based on the sensor data;

analyzing the light source to be a glare light source or an ambient light source based on the reflection; and performing one or more operations based at least in part on the analysis.

The invention claimed is:

1. A method to compensate for a light source perceived in a field of view of a viewer of a display device, the method comprising:

receiving sensor data from one or more light sensors mounted on a wearable device worn by the viewer, wherein a field of view for the light sensors covers at least the field of view of the viewer;

identifying the light source perceived in the field of view of the viewer based on the sensor data;

determining whether the light source is a light source reflected off a surface of the display device;

if the light source is a light source reflected off a surface of the display device, analyzing an average luminance and a variation of luminance for the surface of the display device; and identifying if the light source is a diffuse ambient light source or a glare light source based on the average luminance and the variation of luminance; and performing one or more operations, by a display controller of the display device, to compensate for a change in brightness or color of content displayed by the display device caused by the light source, based at least in part on light source information of the light source identified.

2. The method of claim 1, further comprising:
tracking a change in luminance of the light source over a predetermined period of time to determine whether the change in luminance is gradual or abrupt; and
identifying the light source using a deterministic algorithm based on the tracked changes.

3. The method of claim 1, wherein a glare light source is identified by identifying a portion of the surface of the display device with a large variation of luminance.

4. The method of claim 1, wherein a glare light source is identified by identifying one or more artifacts via a positional discrepancy between images captured by a left light sensor and a right light sensor of the one or more light sensors mounted on the wearable device or a temporal discrepancy between two or more images of a light sensor of the wearable device.

5. The method of claim 1, further comprising:
if the light source is a light source reflected off a surface of the display device, identifying whether the light source is controllable; and
if the light source is controllable, controlling a brightness of the light source; and
if the light source is not controllable, suggesting manual action or a change in viewing position to the viewer.

6. The method of claim 5, wherein determining if the light source is controllable comprises:
automatically detecting internet of things (IOT) based light sources for the room over a local network; and
registering each of the detected light sources as a controllable light source.

7. The method of claim 1, wherein the one or more light sensors mounted on the wearable device worn by the viewer include a left light sensor and a right light sensor to a left side and a right side of a left eye and a right eye of the viewer respectively.

8. The method of claim 1, further comprising:
if the light source is not a light source reflected off a surface of the display device, determining if the light source is perceived in the field of view of the viewer;
if the light source is perceived in the field of view of the viewer, determining a shortest distance from the light source to an edge of the surface of the display device;
determining an intensity of the light source for the one or more operations to be performed based on the determined distance and intensity.

9. The method of claim 8, if there are two or more viewers, the one or more operations is to be performed based on an average or weighted intensity perceived in a field of view for each of the two or more viewers.

10. The method of claim 8, further comprising:
determining if the light source is perceived in a field of view of a left, a right, or both eyes of the viewer wearing the wearable device based on images captured by a left and a right light sensor of the one or more light sensors mounted on the wearable device.

11. The method of claim 10, further comprising:
if the left and right light sensors both sense the light source, determining that the light source is visible to both eyes of the viewer.

12. The method of claim 10, further comprising:
if only one of the left or the right light sensor, but not both, senses the light source, determining a vantage point of eye for the viewer based on a measured vantage point of sensor, and a distance offset from the sensor to the eye of the viewer being projected a distance from the wearable device to the surface of the display device;
determining if, based on the vantage point of eye, the light source is occluded by the surface of the display device; and
if the light source is determined to be occluded by the surface of the display device, determining that the light source is not visible to both eyes.

13. The method of claim 12, further comprising:
determining a motion vector of the wearable device based on a motion sensor mounted on the wearable device; and
determining if, based on the vantage point of eye, the light source is occluded by the surface of the display device based on the value of the motion vector.

14. The method of claim 1, wherein the one or more operations to be performed by the display device comprise:
adjusting a black level displayed by the display device; and
adjusting a tone mapping characteristic of the display device.

15. The method of claim 1, wherein the one or more operations to be performed by the display device comprise notifying a viewer to take a manual action to compensate for a non-controllable glare light source.

16. The method of claim 1, wherein the one or more sensors include one or more light transducers, image capturing devices, or video capturing devices.

17. The method of claim 1, wherein transmitting the data for one or more operations to be performed by the display device causes the display device to look up an entry in a look-up table or parametric adjustment parameters for one or more operations to be performed based on a type of the light source to cause the one or more operations to be performed.

18. The method of claim 1, wherein the wearable device includes a wearable headset.

19. The method of claim 18, wherein the wearable headset includes a headphone.

20. The method of claim 1, further comprising:
receiving the sensor data from the one or more light sensors mounted on the wearable device worn by the viewer, by the display controller of the display device;
retrieving from the received data the light source information identifying the light source perceived in the field of view of the viewer;
looking up in a look-up-table or a parametric table the one or more operations to be performed based on the light source information to compensate for a change in brightness or color of the content caused by the light source.

21. A non-transitory machine readable medium storing instructions which when executed by a processor cause the processor to perform a method claim 1.

22. A wearable device which includes a memory and a processor configured to perform a method of claim 1.

23. A method to identify a light source, the method comprising:
- receiving sensor data from one or more light sensors mounted on or close to a display device in a room, wherein the one or more light sensors is directed at a viewer viewing the display device;
- identifying a reflection for a light source on a passive surface of the viewer based on the sensor data;
- determining whether the light source is a light source reflected off a surface of the display device;
- analyzing the light source to be a glare light source or an ambient light source based on the reflection by analyzing an average luminance and a variation of luminance for the surface of the display device;
- identifying if the light source is a diffuse ambient light source or a glare light source based on the average luminance and the variation of luminance; and
- performing one or more operations based at least in part on the analysis.

\* \* \* \* \*